US012771589B2

(12) United States Patent
Wang et al.

(10) Patent No.: US 12,771,589 B2
(45) Date of Patent: Oct. 20, 2026

(54) DATA TRANSMISSION METHOD

(71) Applicant: HUAWEI TECHNOLOGIES CO., LTD., Shenzhen (CN)

(72) Inventors: Ting Wang, Shanghai (CN); Yongxia Lyu, Shenzhen (CN); Jun Wang, Shanghai (CN); Jianglei Ma, Ottawa (CA); Liqing Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 471 days.

(21) Appl. No.: 18/352,338

(22) Filed: Jul. 14, 2023

(65) Prior Publication Data

US 2023/0362048 A1 Nov. 9, 2023

Related U.S. Application Data

(63) Continuation of application No. PCT/CN2021/141255, filed on Dec. 24, 2021.

(30) Foreign Application Priority Data

Jan. 15, 2021 (CN) ......................... 202110056460.6

(51) Int. Cl.
*H04L 27/34* (2006.01)
*H04L 27/18* (2006.01)

(52) U.S. Cl.
CPC .............. *H04L 27/34* (2013.01); *H04L 27/18* (2013.01); *H04L 27/3405* (2013.01)

(58) Field of Classification Search
CPC ..... H04L 27/34; H04L 27/18; H04L 27/3405; H04L 27/3444; H04L 27/0008;
(Continued)

(56) References Cited

U.S. PATENT DOCUMENTS 11,848,718 B2 * 12/2023 Deenoo ................ H04B 17/327
2011/0122970 A1 * 5/2011 Chappaz ............. H04L 27/2017 375/295

(Continued)

FOREIGN PATENT DOCUMENTS

CN 102197616 A 9/2011
CN 103378921 A * 10/2013 ........... H04L 1/0054

(Continued)

OTHER PUBLICATIONS

International Search Report and Written Opinion in International Appln. No. PCT/CN2021/141255, mailed on Mar. 22, 2022, 13 pages (with English translation).

*Primary Examiner* — Atique Ahmed
(74) *Attorney, Agent, or Firm* — Fish & Richardson P.C.

(57) ABSTRACT

Embodiments of this application provide data transmission methods and apparatuses. In an implementation, a method includes: determining information about a first modulation constellation diagram and communicating with a first device based on the first modulation constellation diagram, wherein the first modulation constellation diagram comprises M constellation points, and wherein the information about the first modulation constellation diagram comprises one of: a value range of M1 constellation points in the first modulation constellation diagram, wherein M1 is an integer greater than or equal to 1 and less than or equal to M; offsets of M1 constellation points in the first modulation constellation diagram relative to M1 constellation points in a reference modulation constellation diagram, wherein M1 is an integer greater than or equal to 1 and less than or equal to M; or a rotation phase of the first modulation constellation diagram relative to a reference modulation constellation diagram.

20 Claims, 8 Drawing Sheets

(58) Field of Classification Search
CPC . H04L 27/3411; H04L 1/0058; H04L 1/0047; H04L 27/3483; H04L 27/38; H04L 27/36; H04L 27/2665; H04L 27/2663; H04L 25/0228
See application file for complete search history.

(56) References Cited

U.S. PATENT DOCUMENTS

| | | | | |
|---|---|---|---|---|
| 2016/0134458 | A1* | 5/2016 | Xia | H04L 27/3483 370/329 |
| 2017/0093435 | A1* | 3/2017 | Ikegaya | H03M 13/2792 |
| 2017/0201989 | A1* | 7/2017 | Fakoorian | H04L 5/0046 |
| 2018/0241464 | A1* | 8/2018 | Michaels | H04B 7/18539 |
| 2019/0254013 | A1* | 8/2019 | Chang | H04L 5/00 |
| 2021/0160116 | A1* | 5/2021 | Xin | H04L 27/2615 |
| 2021/0377086 | A1* | 12/2021 | Hussein | H04L 27/2064 |

FOREIGN PATENT DOCUMENTS

| | | | | | |
|---|---|---|---|---|---|
| CN | 106713213 | B | * | 9/2018 | H04L 27/36 |
| CN | 108964681 | B | * | 9/2020 | H04B 1/04 |
| CN | 112383499 | A | * | 2/2021 | H04L 27/38 |
| CN | 107040487 | B | * | 6/2021 | H04L 27/2621 |
| EP | 3075125 | B1 | * | 8/2018 | H04L 27/3405 |

* cited by examiner

DATA TRANSMISSION METHOD

CROSS-REFERENCE TO RELATED APPLICATIONS

This application is a continuation of International Application No. PCT/CN2021/141255, filed on Dec. 24, 2021, which claims priority to Chinese Patent Application No. 202110056460.6, filed on Jan. 15, 2021. The disclosures of the aforementioned applications are hereby incorporated by reference in their entireties.

TECHNICAL FIELD

This application relates to the field of communication technologies, and in particular, to a data transmission method and an apparatus.

BACKGROUND

In a communication system, when a transmit end device and a receive end device perform data transmission, the transmit end device may perform constellation mapping on a to-be-sent bitstream based on a modulation constellation diagram to obtain a modulation symbol, and send the modulation symbol to the receive end device. After receiving the modulation symbol, the receive end device may restore a received bitstream based on the modulation constellation diagram. In this transmission mechanism, more information bits can be carried on a given transmission resource. A design of a modulation constellation diagram affects a bit error rate (BER) and/or a peak-to-average power ratio (PAPR) during data transmission. Therefore, how to design a modulation constellation diagram is an important research topic.

SUMMARY

Embodiments of this application provide a data transmission method, so that two devices can communicate with each other by using an irregular modulation constellation diagram that matches a communication environment in which the two devices are located, to achieve a low BER and a low PAPR.

According to the first aspect, a data transmission method is provided, including: determining information about a first modulation constellation diagram; and communicating with a first device based on the first modulation constellation diagram. The first modulation constellation diagram is an irregular modulation constellation diagram.

According to this method, the first device and a second device may communicate with each other by using an irregular modulation constellation diagram that matches a communication environment in which the first device and the second device are located, so that a relatively low BER and a relatively low PAPR can be achieved, and therefore a relatively high data transmission rate and relatively low power consumption can be achieved. Optionally, the first device is an access network device, and the second device is a terminal device; or the second device and the second device are two terminal devices that perform D2D communication.

In a possible implementation, the first modulation constellation diagram includes M constellation points, M is a positive integer, and the information about the first modulation constellation diagram includes: a value range of M1 constellation points in the first modulation constellation diagram, where M1 is an integer greater than or equal to 1 and less than or equal to M; offsets of M1 constellation points in the first modulation constellation diagram relative to M1 constellation points in a reference modulation constellation diagram, where M1 is an integer greater than or equal to 1 and less than or equal to M; or a rotation phase of the first modulation constellation diagram relative to a reference modulation constellation diagram.

According to this method, a design of the first modulation constellation diagram can be simplified, or when the information about the first modulation constellation diagram needs to be notified, signaling overheads can be reduced.

In a possible implementation, the value range of the M1 constellation points in the first modulation constellation diagram includes at least one of the following: an amplitude range of all of the M1 constellation points, and a phase range of all of the M1 constellation points.

Optionally, the amplitude range of all of the M1 constellation points includes: an amplitude extension range of the M1 constellation points relative to the M1 constellation points in the reference modulation constellation diagram.

Optionally, the phase range of all of the M1 constellation points includes: a phase extension range of the M1 constellation points relative to the M1 constellation points in the reference modulation constellation diagram.

For example, the M constellation points in the first modulation constellation diagram respectively one-to-one correspond to M constellation points in the reference constellation diagram. A phase of each constellation point in the first modulation constellation diagram is a phase of a constellation point that corresponds to the constellation point and that is in the reference constellation diagram. Values of amplitudes of the M1 constellation points in the first modulation constellation diagram are a first value range (that is, an amplitude range). For each constellation point in the M2 constellation points in the first modulation constellation diagram, an amplitude of the constellation point is an amplitude of a constellation point that corresponds to the constellation point and that is in the reference constellation diagram. For one of the M1 constellation points, the first value range is Z1 to Z2, where Z1 and Z2 are real numbers; or the first value range is W−Z3 to W+Z4, where W is an amplitude of a constellation point that corresponds to the constellation point and that is in the reference constellation diagram. Z3 and Z4 are real numbers.

For example, the M constellation points in the first modulation constellation diagram respectively one-to-one correspond to M constellation points in the reference constellation diagram. An amplitude of each constellation point in the first modulation constellation diagram is an amplitude of a constellation point that corresponds to the constellation point and that is in the reference constellation diagram. Values of phases of the M1 constellation points in the first modulation constellation diagram are a second value range (that is, a phase range). For each constellation point in the M2 constellation points in the first modulation constellation diagram, a phase of the constellation point is a phase of a constellation point that corresponds to the constellation point and that is in the reference constellation diagram. For one of the M1 constellation points, the second value range is θ1 to θ2, where θ1 and θ2 are real numbers; or the second value range is $\theta_r$−θ3 to $\theta_r$+θ4, where $\theta_r$ is a phase of a constellation point that corresponds to the constellation point and that is in the reference constellation diagram. θ3 and θ4 are real numbers.

According to this method, a design of the first modulation constellation diagram can be simplified, or when the information about the first modulation constellation diagram needs to be notified, signaling overheads can be reduced.

In a possible implementation, the first modulation constellation diagram is included in N1 modulation constellation diagrams, where N1 is an integer greater than or equal to 1; the N1 modulation constellation diagrams are modulation constellation diagrams corresponding to a terminal device of a first type; and the communicating with a first device includes: transmitting data of a first terminal device with the first device, where a type of the first terminal device is the first type.

Optionally, the N1 modulation constellation diagrams and N2 modulation constellation diagrams are included in N3 modulation constellation diagrams, N3 is an integer greater than N1 and N2, N2 is an integer greater than or equal to 1, and the N2 modulation constellation diagrams are modulation constellation diagrams corresponding to a terminal device of a second type.

Optionally, the value range is a value range corresponding to the terminal device of the first type. For example, the amplitude range is an amplitude range corresponding to the terminal device of the first type. For example, the phase range is a phase range corresponding to the terminal device of the first type.

For example, Z1 and/or Z2 are/is independently set for each type of terminal device. Alternatively, Z3 and/or Z4 are/is independently set for each type of terminal device. Alternatively, for example, $\theta 1$ and/or $\theta 2$ are/is independently set for each type of terminal device. Alternatively, $\theta 3$ and/or $\theta 4$ are/is independently set for each type of terminal device.

Optionally, the offset is an offset corresponding to the terminal device of the first type.

Optionally, the rotation phase is a rotation phase corresponding to the terminal device of the first type.

According to this method, respective modulation constellation diagrams may be set for different types of terminal devices, to meet requirements of the different types of terminal devices, so that data transmission of various types of terminal devices can achieve a relatively low BER and a relatively low PAPR.

In a possible implementation, information about the N1 modulation constellation diagrams is specified in a protocol.

According to this method, signaling overheads can be reduced.

In a possible implementation, the method further includes: downloading information about the N1 modulation constellation diagrams from a database.

In a possible implementation, the method further includes: sending information about the N1 modulation constellation diagrams to the first device.

In a possible implementation, the method further includes: receiving information about the N1 modulation constellation diagrams from the first device.

According to this method, there may be an opportunity to reconfigure the information about the N1 modulation constellation diagrams, so that the information about the N1 modulation constellation diagrams can be adjusted based on a communication environment.

In a possible implementation, the method further includes: sending first indication information to the first device, where the first indication information indicates a recommended modulation constellation diagram.

In a possible implementation, the method further includes: receiving second indication information from the first device, where the second indication information indicates the first modulation constellation diagram.

In a possible implementation, that the second indication information indicates the first modulation constellation diagram includes: The second indication information indicates an index of the first modulation constellation diagram.

In a possible implementation, that the second indication information indicates the first modulation constellation diagram includes: The second indication information indicates an identifier of a modulation constellation diagram group to which the first modulation constellation diagram belongs, and an index of the first modulation constellation diagram in the modulation constellation diagram group. Optionally, modulation constellation diagrams in the modulation constellation diagram group have a same order. Optionally, the second indication information further indicates a bit rate corresponding to the communication.

According to this method, there may be an opportunity to reconfigure the first modulation constellation diagram, so that the first modulation constellation diagram can be adjusted based on a communication environment.

In a possible implementation, the communicating with a first device includes: performing, with the first device, communication between the first device and a second device, where the second device supports an irregular modulation constellation diagram. Optionally, the method further includes: sending capability information to the first device, where the capability information indicates whether the second device supports an irregular modulation constellation diagram.

The method may be applied to the following case: If the second device supports an irregular modulation constellation diagram, communication is performed with the first device by using the irregular modulation constellation diagram; or if the second device does not support an irregular modulation constellation diagram, communication is performed with the first device by using a regular modulation constellation diagram. According to this method, a capability of a conventional device and a capability of a new device can be compatible. For example, the conventional device may not support an irregular modulation constellation diagram.

In a possible implementation, the method further includes: receiving indication information from the first device, where a value of the indication information is in a second state.

The method may be applied to the following case: If the value of the indication information is in the second state, communication is performed with the first device by using an irregular modulation constellation diagram; or if the value of the indication information is in a first state, communication is performed with the first device by using a regular modulation constellation diagram. According to this method, an irregular modulation constellation diagram may be used according to a requirement. Therefore, a rigid system design can be avoided, and various requirements can be met.

In a possible implementation, the communicating with a first device includes: performing, with the first device, communication between the first device and a second device, where the communication is included in a second communication process. For example, the second communication process includes a communication process in which the second device is in an RRC connected mode.

The method may be applied to the following case: For a first communication process, the first device and the second device communicate with each other by using a conventional regular modulation constellation diagram. For the second communication process, the first device and the second device communicate with each other by using the first modulation constellation diagram. For example, the first communication process includes a communication process in which the second device is in an RRC non-connected mode (for example, an RRC idle mode and/or an RRC inactive mode), an initial access process, an RRC connection establishment process, and/or an RRC reconfiguration process. According to this method, a modulation constellation diagram may be determined based on a communication process, so that the modulation constellation diagram can match a requirement of the communication process, and a low BER and/or a low PAPR can be achieved.

In a possible implementation, the communication includes transmitting DCI, where the DCI is DCI in a second control information format, and/or the DCI is DCI scrambled by using a second CRC scrambling identifier.

The method may be applied to: transmitting control information in a first control information format by using a conventional regular modulation constellation diagram, and transmitting control information in the second control information format by using the first modulation constellation diagram; and/or transmitting, by using a conventional regular modulation constellation diagram, control information scrambled based on a first CRC scrambling identifier, and transmitting, by using the first modulation constellation diagram, control information scrambled based on the second CRC scrambling identifier. According to this method, a modulation constellation diagram can be determined based on a DCI format and/or a scrambling identifier, so that the modulation constellation diagram can match a requirement of the DCI, and a low BER and/or a low PAPR can be achieved.

According to the second aspect, a data transmission method is provided, including: determining information about a first modulation constellation diagram; and communicating with a second device based on the first modulation constellation diagram.

For descriptions of the first modulation constellation diagram, refer to the first aspect. Details are not described again.

In a possible implementation, the first modulation constellation diagram is included in N1 modulation constellation diagrams, where N1 is an integer greater than or equal to 1; the N1 modulation constellation diagrams are modulation constellation diagrams corresponding to a terminal device of a first type; and the communicating with a second device includes: transmitting data of a first terminal device with the second device, where a type of the first terminal device is the first type.

Optionally, the N1 modulation constellation diagrams and N2 modulation constellation diagrams are included in N3 modulation constellation diagrams, N3 is an integer greater than N1 and N2, N2 is an integer greater than or equal to 1, and the N2 modulation constellation diagrams are modulation constellation diagrams corresponding to a terminal device of a second type.

In a possible implementation, information about the N1 modulation constellation diagrams is specified in a protocol.

In a possible implementation, the method further includes: downloading information about the N1 modulation constellation diagrams from a database.

In a possible implementation, the method further includes: receiving information about the N1 modulation constellation diagrams from the second device.

In a possible implementation, the method further includes: sending information about the N1 modulation constellation diagrams to the second device.

In a possible implementation, the method further includes: receiving first indication information from the second device, where the first indication information indicates a recommended modulation constellation diagram.

In a possible implementation, the method further includes: sending second indication information to the second device, where the second indication information indicates the first modulation constellation diagram.

For descriptions of the second indication information, refer to the first aspect. Details are not described again.

According to the third aspect, an apparatus is provided, configured to implement the method described in the first aspect. The apparatus may be a terminal device, or may be another apparatus that can implement the method described in the first aspect. The another apparatus can be installed in the terminal device, or can match the terminal device for use. In a design, the apparatus may include a module one-to-one corresponding to the method/operation/step/action described in the first aspect. The module may be a hardware circuit, software, or a combination of a hardware circuit and software. In a design, the apparatus may include a processing module and a communication module.

In a possible implementation, the processing module is configured to determine information about a first modulation constellation diagram; and the processing module communicates with a first device based on the first modulation constellation diagram by using the communication module.

For descriptions of the first modulation constellation diagram, refer to the first aspect. Details are not described again.

For other information that can be received and/or sent by the communication module, refer to the description in the first aspect. Details are not described herein again.

According to the fourth aspect, an apparatus is provided, configured to implement the method described in the second aspect. The apparatus may be an access network device, or may be another apparatus that can implement the method described in the second aspect. The another apparatus can be installed in the access network device, or can match the access network device for use. In a design, the apparatus may include a module one-to-one corresponding to the method/operation/step/action described in the second aspect. The module may be a hardware circuit, software, or a combination of a hardware circuit and software. In a design, the apparatus may include a processing module and a communication module.

In a possible implementation, the processing module is configured to determine information about a first modulation constellation diagram; and the processing module communicates with a second device based on the first modulation constellation diagram by using the communication module.

For descriptions of the first modulation constellation diagram, refer to the second aspect. Details are not described again.

For other information that can be received and/or sent by the communication module, refer to the description in the second aspect. Details are not described herein again.

According to the fifth aspect, an embodiment of this application provides an apparatus. The apparatus includes a processor, configured to implement the method described in the first aspect. The apparatus may further include a memory, configured to store instructions. The memory is coupled to the processor, and when executing the instructions stored in the memory, the processor can implement the method described in the first aspect. The apparatus may further include a communication interface, and the communication interface is used by the apparatus to communicate with another device. In this embodiment of this application, the communication interface may be a transceiver, a circuit, a bus, a module, a pin, or another type of communication interface.

In a possible design, the apparatus includes:

the memory, configured to store program instructions; and the processor, configured to determine information about a first modulation constellation diagram;

and communicate with a first device based on the first modulation constellation diagram by using the communication interface.

For descriptions of the first modulation constellation diagram, refer to the first aspect. Details are not described again.

For other information that can be received and/or sent by the processor through the communication interface, refer to the description in the first aspect. Details are not described herein again.

According to the sixth aspect, an embodiment of this application provides an apparatus. The apparatus includes a processor, configured to implement the method described in the second aspect. The apparatus may further include a memory, configured to store instructions. The memory is coupled to the processor, and when executing the instructions stored in the memory, the processor can implement the method described in the second aspect. The apparatus may further include a communication interface, and the communication interface is used by the apparatus to communicate with another device.

In a possible design, the apparatus includes:

the memory, configured to store program instructions; and the processor, configured to determine information about a first modulation constellation diagram;

and communicate with a second device based on the first modulation constellation diagram by using the communication interface.

For descriptions of the first modulation constellation diagram, refer to the second aspect. Details are not described again.

For other information that can be received and/or sent by the processor through the communication interface, refer to the description in the second aspect. Details are not described herein again.

According to the seventh aspect, a communication system is provided, including the apparatus according to the third aspect or the fifth aspect and the apparatus according to the fourth aspect or the sixth aspect.

According to the eighth aspect, a computer-readable storage medium is provided, including instructions. When the instructions are run on a computer, the computer is enabled to perform the method in any one of the foregoing method embodiments.

According to the ninth aspect, a computer program product is provided, including instructions. When the computer program product runs on a computer, the computer is enabled to perform the method in any one of the foregoing method embodiments.

According to the tenth aspect, a chip system is provided. The chip system includes a processor, may further include a memory, and is configured to implement the method in any one of the foregoing method embodiments. The chip system may include a chip, or may include a chip and another discrete component.

DESCRIPTION OF EMBODIMENTS

Figure 1:
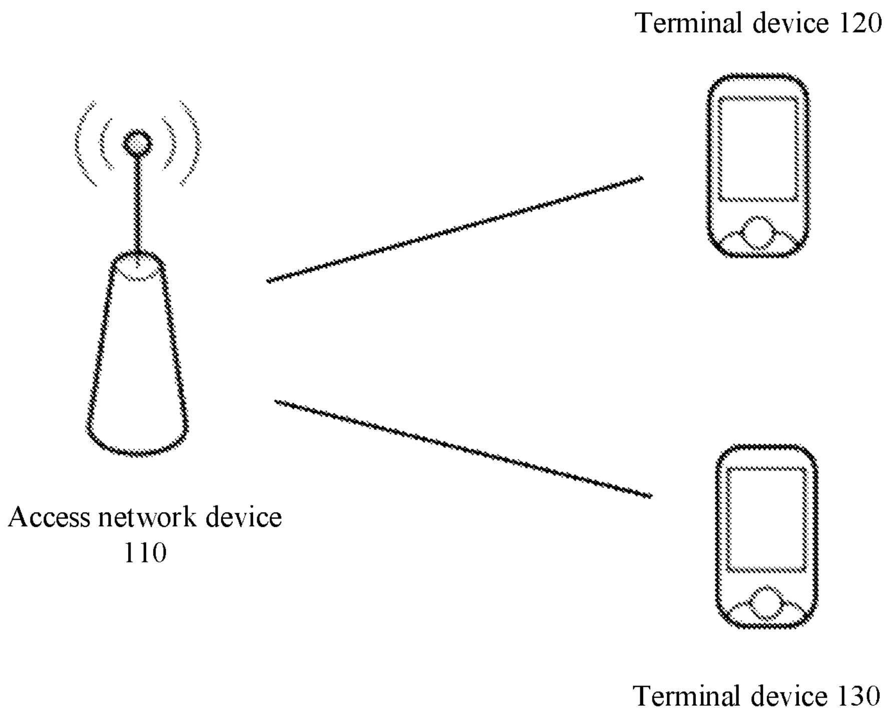
FIG. 1 is a schematic diagram of an architecture of a communication system according to an embodiment of this application.

Technical solutions provided in embodiments of this application may be applied to various communication systems, for example, a long term evolution (LTE) system, a 5th generation (5G) mobile communication system, a wireless fidelity (Wi-Fi) system, a future 6th generation mobile communication system, or a system integrating a plurality of communication systems. This is not limited in embodiments of this application. 5G may also be referred to as new radio (NR).

The technical solutions provided in embodiments of this application may be applied to various communication scenarios, for example, may be applied to one or more of the following communication scenarios: enhanced mobile broadband (eMBB) communication, ultra-reliable low-latency communication (URLLC), machine type communication (MTC), massive machine type communications (mMTC), device-to-device (D2D) communication, vehicle-to-everything (V2X) communication, vehicle-to-vehicle (V2V) communication, non-terrestrial network (NTN) communication, internet of things (IoT) communication, and the like.

The technical solutions provided in embodiments of this application may be applied to communication between communication devices, and in particular, may be applied to communication between communication devices in a mobile communication network. Communication between communication devices may include communication between an access network device and a terminal device, communication between access network devices (for example, communication between a macro base station and a micro base station in a wireless backhaul scenario), and/or communication between terminal devices (for example, communication between two terminal devices in a D2D scenario). The term "communication" may also be described as "transmission", "information transmission", "data transmission", "signal transmission", or the like. Transmission may include sending and/or receiving. For example, communication between an access network device and a terminal device includes: The access network device sends downlink data, a signal, or information to the terminal device, and/or the terminal device sends uplink data, a signal, or information to the access network device. In embodiments of this application, communication between an access network device and a terminal device is used as an example to describe the technical solutions. A person skilled in the art may also use the technical solutions for communication between another transmit end device and another receive end device, for example, communication between a macro base station and a micro base station, and/or communication between a first terminal device and a second terminal device.

In embodiments of this application, communication devices may communicate with each other by using a licensed spectrum, or may communicate with each other by using an unlicensed spectrum, or may communicate with each other by using both a licensed spectrum and an unlicensed spectrum. Embodiments of this application are applicable to a low-frequency scenario (for example, a scenario in which a carrier frequency is lower than 6 gigahertz (GHz), where the scenario may be referred to as a sub-6G scenario), a high-frequency scenario (for example, a scenario in which a carrier frequency is higher than 6 GHz and/or an optical communication scenario), and a terahertz scenario. For example, an access network device and a terminal device may communicate with each other by using a spectrum lower than 6 GHz, may communicate with each other by using a spectrum higher than 6 GHz, or may communicate with each other by using both a spectrum lower than 6 GHz and a spectrum higher than 6 GHz. A spectrum resource used for communication is not limited in embodiments of this application.

In embodiments of this application, “a plurality of” may be two, three, four, or more. “At least one” may be one or more.

In embodiments of this application, “/” may indicate an “or” relationship between associated objects. For example, A/B may indicate A or B. “And/or” may be used to describe three relationships between associated objects. For example, A and/or B may indicate three cases: Only A exists, both A and B exist, and only B exists. A and B may be singular or plural. In embodiments of this application, words such as “first”, “second”, “A”, and “B” may be used to distinguish between technical features with same or similar functions. The words such as “first”, “second”, “A”, and “B” do not limit a quantity or an execution order, and the words such as “first” and “second” do not necessarily indicate a difference. Terms such as “example” or “for example” are used to represent giving an example, an illustration, or a description. Any embodiment or design scheme described with “example” or “for example” should not be explained as being more preferred or having more advantages than another embodiment or design scheme. The words such as “example” or “for example” are used to present a related concept in a specific manner for ease of understanding.

FIG. 1 is a schematic diagram of an architecture of a communication system according to an embodiment of this application. As shown in FIG. 1, the communication system includes an access network device 110, a terminal device 120, and a terminal device 130. The terminal devices 120 and 130 may perform uplink and/or downlink signal transmission with the access network device 110. Quantities of access network devices and terminal devices included in the communication system are not limited in embodiments of this application. Optionally, the communication system may further include a node (not shown) configured to implement an artificial intelligence (AI) function. The node may communicate with the access network device 110.

The terminal device in embodiments of this application may also be referred to as a terminal, and may be a device with wireless sending and receiving functions. The terminal device can perform wireless communication with the access network device. The terminal device may provide voice and/or data connectivity for a user. The terminal device may be deployed on land, and include an indoor terminal device, an outdoor terminal device, a handheld terminal device, and/or a vehicle-mounted terminal device; or may be deployed on a water surface (for example, on a ship); or may be deployed in the air (for example, on an aircraft, a balloon, or a satellite). The terminal device may be user equipment (UE). The UE includes a handheld device, a vehicle-mounted device, a wearable device, or a computing device with a wireless communication function. For example, the UE may be a mobile phone, a tablet computer, or a computer with wireless sending and receiving functions. The terminal device may alternatively be a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in a smart city, a wireless terminal in a smart home, and/or the like.

In embodiments of this application, an apparatus configured to implement a function of a terminal device may be a terminal device, or may be an apparatus that can support the terminal device in implementing the function, for example, a chip system. The apparatus can be installed in the terminal device, or can match the terminal device for use. In embodiments of this application, the chip system may include a chip, or may include a chip and another discrete component. An example in which an apparatus configured to implement a function of a terminal device is a terminal device and the terminal device is UE is used to describe the technical solutions provided in embodiments of this application.

The access network device in embodiments of this application includes a base station (BS), and may be a device that is deployed in a radio access network (RAN) and that can perform wireless communication with a terminal device. Optionally, the radio access network may also be referred to as an access network for short. There may be a plurality of forms of base stations, such as a macro base station, a micro base station, a relay node, or an access point. The base station in embodiments of this application may be a base station in a 5G system, a base station in an LTE system, or a base station in another system. This is not limited. The base station in the 5G system may also be referred to as a transmission reception point (TRP) or a next-generation NodeB (gNB or gNodeB).

The base station in embodiments of this application may be an integrated base station, or may be a base station including a plurality of hardware modules and/or a plurality of software modules, for example, a base station including a central unit (CU) and a distributed unit (DU). A base station including a CU and a DU may also be referred to as a base station in which a CU and a DU are separated. For example, the base station includes a gNB-CU and a gNB-DU. The CU may be further separated into a CU control plane (CU-CP) and a CU user plane (CU-CP). For example, the base station includes a gNB-CU-CP, a gNB-CU-UP, and a gNB-DU.

In embodiments of this application, an apparatus configured to implement a function of an access network device may be an access network device, or may be an apparatus that can support the access network device in implementing the function, for example, a chip system. The apparatus can be installed in the access network device, or can match the access network device for use. In the technical solutions provided in embodiments of this application, an example in which an apparatus configured to implement a function of an access network device is an access network device and the access network device is a base station is used to describe the technical solutions provided in embodiments of this application.

When a base station communicates with UE, for example, when the base station sends a downlink signal to the UE, and/or when the UE sends an uplink signal to the base station, a transmit end device modulates a to-be-sent bitstream by using a modulation constellation diagram, and a receive end device demodulates a received modulation symbol by using the modulation constellation diagram. In this process, a design of the modulation constellation diagram affects a bit error rate (BER) and a peak-to-average power ratio (PAPR) during signal transmission. For example, a longer distance between adjacent constellation points in the modulation constellation diagram indicates that it is easier for the receive end device to correctly perform demodulation, a BER of a transmitted signal is lower, and a signal transmission rate is higher. For another example, a larger amplitude change range and/or a smaller phase change range of a constellation point in the modulation constellation diagram indicate/indicates a higher PAPR of a to-be-sent signal and a higher requirement on a power amplifier of the transmit end device. In this case, the power amplifier of the transmit end device needs to have a relatively wide linear range (which may also be referred to as a dynamic range). If the power amplifier does not have a relatively wide linear range, the to-be-sent signal is distorted after passing through the power amplifier, and consequently, a BER of the sent signal increases. However, when the power amplifier has a relatively wide linear range, amplification efficiency is relatively low, and power consumption of the transmit end device may be relatively high.

In a possible implementation, a protocol specifies that a base station side and a UE side use a regular modulation constellation diagram, for example, a phase shift keying (PSK) modulation constellation diagram (for example, a binary phase shift keying (BPSK) modulation constellation diagram, a π/2-BPSK modulation constellation diagram, or a quaternary phase shift keying (QPSK) modulation constellation diagram), and/or a quadrature amplitude modulation (QAM) constellation diagram. A value of a constellation point in the regular modulation constellation diagram is fixed. With development of a communication system, a communication environment is increasingly complex, and communication scenarios are increasingly diversified. The regular modulation constellation diagram may not achieve a relatively low BER and a relatively low PAPR in the complex communication environment. Therefore, embodiments of this application provide a concept of a flexible modulation constellation diagram or a variable modulation constellation diagram. The modulation constellation diagram may be irregular. For example, an irregular modulation constellation diagram that matches an actual communication environment may be designed according to the communication environment, to achieve a relatively low BER and a relatively low PAPR.

In embodiments of this application, how to specifically obtain the irregular modulation constellation diagram is not limited. For example, the irregular modulation constellation diagram is obtained through a model training operation by using an artificial intelligence (AI) technology, or is determined by using accumulated historical experience, or is obtained through calculation based on a statistical averaging algorithm. The AI technology includes but is not limited to a machine learning algorithm, for example, a neural network. An AI function includes a model training function and/or an inference function. The training operation may be performed by a base station, a cloud server, a node that is independent of a base station on a network side and that is dedicated to implementing the AI function, or the like. This is not limited. The inference operation may be performed by a base station, a cloud server, a node that is independent of a base station on a network side and that is dedicated to implementing the AI function, or the like. This is not limited. An entity that performs the training operation and an entity that performs the inference operation may be the same or may be different. This is not limited. The irregular modulation constellation diagram may be agreed on in a protocol after offline training, or may be sent by a base station to UE after online training, or may be sent by UE to a base station after online training. This is not limited. For another example, if an entity that performs online training is not the base station or the UE, the entity may send the trained irregular modulation constellation diagram to the base station, or the entity sends the trained irregular modulation constellation diagram to the base station through forwarding by another device such as a core network device, and then the base station sends the trained irregular modulation constellation diagram to the UE.

In embodiments of this application, the modulation constellation diagram may also be referred to as a constellation diagram for short.

Figure 2:
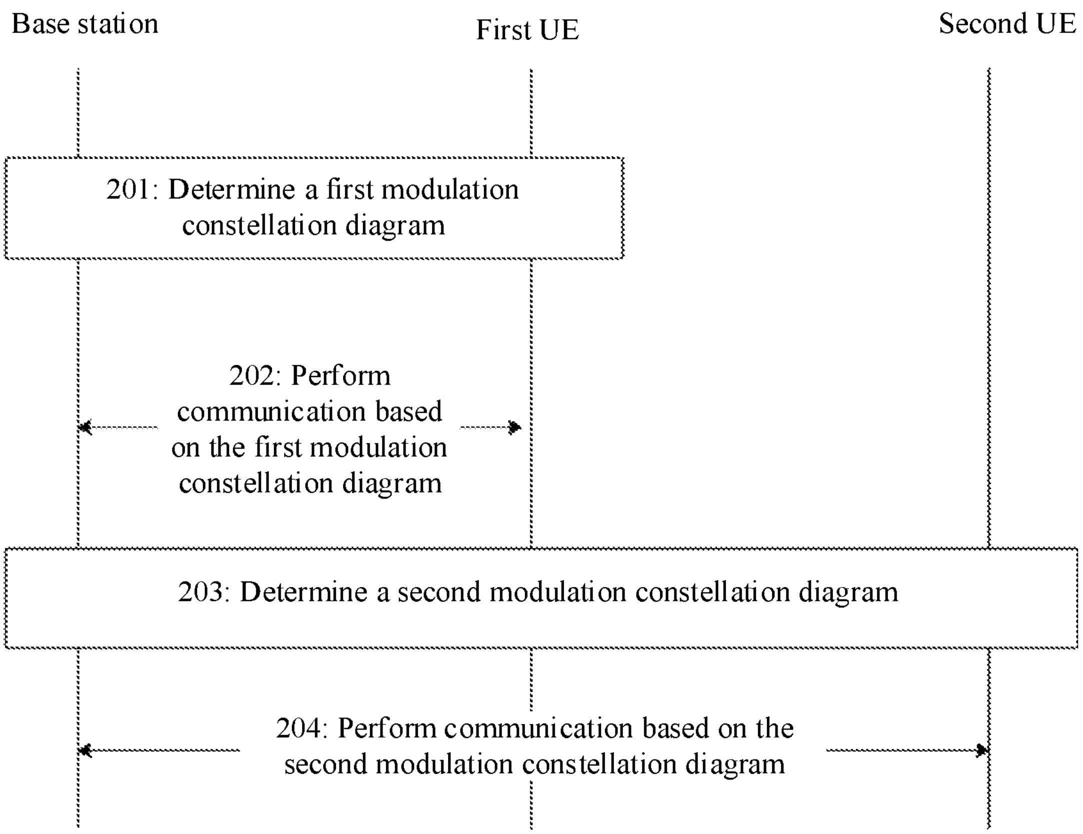
FIG. 2 is a schematic flowchart of a data transmission method according to an embodiment of this application.
Figure 3A:
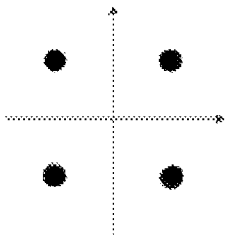
FIG. 3(*a*) to FIG. 3(*g*), FIG. 4(*a*) to FIG. 4(*c*), FIG. 5(*a*) to FIG. 5(*d*), FIG. 6(*a*) to FIG. 6(*d*), and FIG. 7(*a*) and FIG. 7(*b*) are schematic diagrams of modulation constellation diagrams according to an embodiment of this application.
Figure 3B:
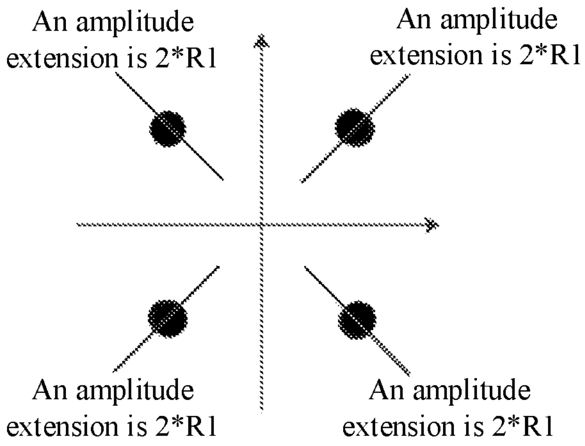
Figure 3C:
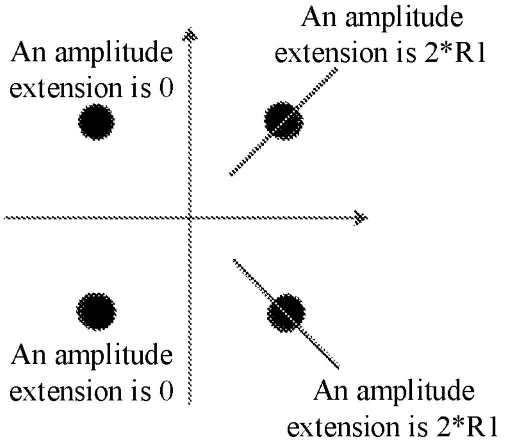
Figure 3D:
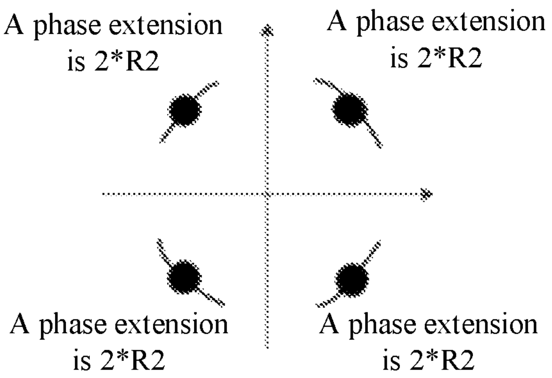
Figure 3E:
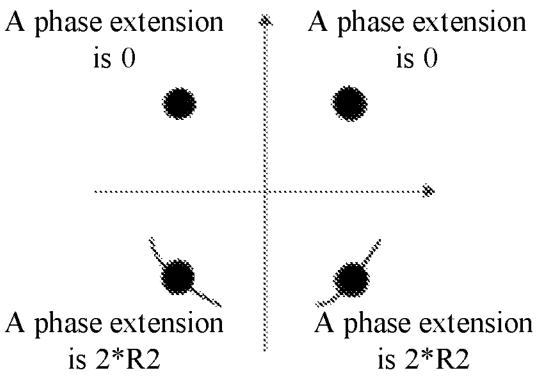
Figure 3F:
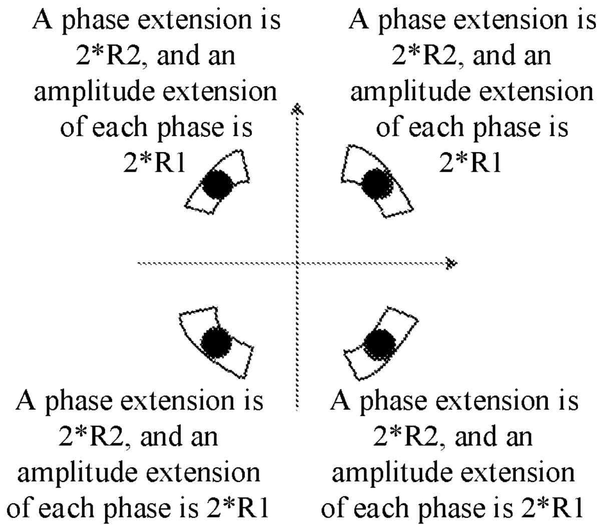
Figure 3G:
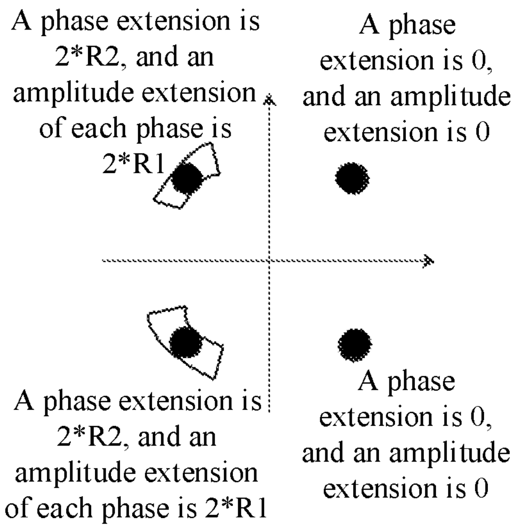

Embodiments of this application mainly focus on how a base station and UE use an irregular modulation constellation diagram to transmit data and how to describe the irregular modulation constellation diagram. The following describes in detail specific designs in embodiments of this application:

FIG. 2 shows a data transmission method according to an embodiment of this application.

Operation 201: A base station determines a first modulation constellation diagram. First UE determines the first modulation constellation diagram.

Determining the first modulation constellation diagram may be described as determining information about the first modulation constellation diagram. The first modulation constellation diagram is an irregular modulation constellation diagram. For example, compared with regular constellation points in a conventional QAM constellation diagram, constellation points in the first modulation constellation diagram are irregular. For example, amplitudes of the constellation points in the conventional QAM constellation diagram are evenly distributed and/or symmetrically distributed, and/or phases of the constellation points in the conventional QAM constellation diagram are evenly distributed and/or symmetrically distributed, each constellation point is a value, and distances between horizontal and vertical adjacent constellation points are the same.

For example, when the conventional constellation diagram is a π/2-BPSK modulation constellation diagram, a bit b(i) is mapped to a modulation symbol d(i) according to the following formula:

$$d(i)=\frac{e^{j*\frac{\pi}{2}*(i \bmod 2)}}{\sqrt{2}}*[(1-2*b(i))+j*(1-2*b(i))]$$

For example, when the conventional constellation diagram is a BPSK modulation constellation diagram, a bit b(i) is mapped to a modulation symbol d(i) according to the following formula:

$$d(i)=\frac{1}{\sqrt{2}}*[(1-2*b(i))+j*(1-2*b(i))]$$

For example, when the conventional constellation diagram is a QPSK modulation constellation diagram, 2 bits: a bit b(2i) and a bit b(2i+1), are mapped to a modulation symbol d(i) according to the following formula:

$$d(i)=\frac{1}{\sqrt{2}}*[(1-2*b(2i))+j*(1-2*b(2i+1))]$$

For example, when the conventional constellation diagram is a 16QAM modulation constellation diagram, 4 bits:

a bit b(4i), a bit b(4i+1), a bit b(4i+2), and a bit b(4i+3), are mapped to a modulation symbol d(i) according to the following formula:

$$d(i) = \frac{1}{\sqrt{10}} * \{(1 - 2 * b(4i)) * [2 - (1 - 2 * b(4i + 2)) + j * (1 - 2 * b(4i + 1))] * [2 - (1 - 2 * b(4i + 3))]\}$$

For example, when the conventional constellation diagram is a 64QAM constellation diagram, 6 bits: a bit b(6i), a bit b(6i+1), a bit b(6i+2), a bit b(6i+3), a bit b(6i+4), and a bit b(6i+5), are mapped to a modulation symbol d(i) according to the following formula:

$$d(i) = \frac{1}{\sqrt{42}} * \{(1 - 2 * b(6i)) * [4 - (1 - 2b * (6i + 2)) * [2 - (1 - 2 * b(6i + 4))] + j * (1 - 2 * b(6i + 1))] * [4 - (1 - 2b * (6i + 3))[2 - (1 - 2b * (6i + 5))]]\}$$

For example, when the conventional constellation diagram is a 256QAM constellation diagram, 8 bits: a bit b(8i), a bit b(8i+1), a bit b(8i+2), a bit b(8i+3), a bit b(8i+4), a bit b(8i+5), a bit b(8i+6), and a bit b(8i+7), are mapped to a modulation symbol d(i) according to the following formula:

$$d(i) = \frac{1}{\sqrt{170}} * \{(1 - 2 * b(8i)) * [8 - (1 - 2b(8i + 2)) * [4 - (1 - 2 * b(8i + 4))[2 - (1 - 2 * b(8i + 6))]]] + j(1 - 2b(8i + 1)) * [8 - (1 - 2 * b(8i + 3)) * [4 - (1 - 2 * b(8i + 5)) * [2 - (1 - 2 * b(8i + 7))]]]\}$$

Herein, b(i) represents the ith bit in a bitstream; j represents an imaginary unit; a square of j is equal to −1; and mod represents a modulo operation.

Optionally, the first modulation constellation diagram may be included in N1 modulation constellation diagrams, where N1 is an integer greater than or equal to 1. When N1 is equal to 1, the first modulation constellation diagram is the N1 modulation constellation diagrams. The N1 modulation constellation diagrams include at least one irregular modulation constellation diagram, and the at least one irregular modulation constellation diagram includes the first modulation constellation diagram.

For example, the N1 modulation constellation diagrams are all irregular modulation constellation diagrams. For another example, at least one of the N1 modulation constellation diagrams is an irregular modulation constellation diagram, and the other modulation constellation diagrams are conventional constellation diagrams, for example, the foregoing BPSK constellation diagram, π/2-BPSK constellation diagram, QPSK constellation diagram, or QAM constellation diagram. For example, N1 is equal to 6, two of the six modulation constellation diagrams are irregular modulation constellation diagrams, and the other four modulation constellation diagrams are any four of a BPSK constellation diagram, a π/2-BPSK modulation constellation diagram, a QPSK constellation diagram, an 8PSK constellation diagram, an 8QAM constellation diagram, a 16QAM constellation diagram, a 64QAM constellation diagram, a 256QAM constellation diagram, and a 1024QAM constellation diagram.

Optionally, determining the first modulation constellation includes: determining N1 modulation constellation diagrams, and determining the first modulation constellation diagram from the N1 modulation constellation diagrams. The determining N1 modulation constellation diagrams may also be described as: determining information about the N1 modulation constellation diagrams. In other words, information about each of the N1 modulation constellation diagrams is determined.

Operation 202: The base station and the first UE communicate with each other based on the first modulation constellation diagram.

For example, the base station may send a downlink modulation symbol to the first UE based on the first modulation constellation diagram, and the first UE may demodulate the received downlink modulation symbol based on the first modulation constellation diagram; and/or the first UE may send an uplink modulation symbol to the base station based on the first modulation constellation diagram, and the base station may demodulate the received uplink modulation symbol based on the first modulation constellation diagram.

Optionally, a first modulation constellation diagram used by the first UE to send a signal may be the same as or different from a first modulation constellation diagram used by the first UE to receive a signal.

The downlink modulation symbol may be carried on a downlink physical channel, for example, a physical broadcast channel (PBCH), a physical downlink shared channel (PDSCH), or a physical downlink control channel (PDCCH). The uplink modulation symbol may be carried on an uplink physical channel, for example, a physical random access channel (PRACH), a physical downlink shared channel (PUSCH), or a physical uplink control channel (PUCCH).

Optionally, in this embodiment of this application, from a perspective of the UE, an uplink may be referred to as a sending link, and a downlink may be referred to as a receiving link. The PDSCH, the PDCCH, the PUSCH, and the PUSCH are merely used as examples of a physical downlink data channel, a physical downlink control channel, a physical uplink data channel, and a physical uplink control channel, respectively. In different systems and different scenarios, a data channel and a control channel each may have different names. This is not limited in this embodiment of this application.

It may be understood that, when a modulation symbol is transmitted between a base station and UE, a transmit end may further perform other physical layer processing on the modulation symbol, for example, one or more of the following processing: layer mapping, precoding, beamforming, antenna port mapping, resource mapping, and the like. Correspondingly, a receive end may perform one or more of the following processing on a received channel: layer demapping, de-precoding, de-beamforming, antenna port demapping, resource demapping, and the like, to obtain a received modulation symbol.

According to the method shown in FIG. 2, the base station and the first UE communicate with each other based on the first modulation constellation diagram. The first modulation constellation diagram may be an irregular modulation constellation diagram that matches a complex communication environment in which the base station and the first UE are located. Therefore, a relatively low BER and a relatively low PAPR may be achieved in the communication process, so that a relatively high data transmission rate and relatively low power consumption can be achieved.

Optionally, for different UE types, a modulation constellation diagram for each UE type may be designed to meet specific requirements of different UE types. Modulation constellation diagrams for any two different UE types may be the same or may be different. This is not limited. One or more modulation constellation diagrams may be designed for one UE type.

Optionally, the base station and/or the UE may determine a modulation constellation diagram based on a UE type.

Optionally, the method shown in FIG. 2 may further include operation 203 in which the base station and second UE determine a second modulation constellation diagram, and operation 204 in which the base station and the second UE communicate with each other based on the second modulation constellation diagram.

In operation 203, determining the second modulation constellation diagram may be described as determining information about the second modulation constellation diagram. The second modulation constellation diagram may be a regular modulation constellation diagram, for example, a conventional PSK constellation diagram or QAM constellation diagram, or may be an irregular modulation constellation diagram.

Optionally, the second modulation constellation diagram may be included in N2 modulation constellation diagrams, where N2 is an integer greater than or equal to 1. When N2 is equal to 1, the second modulation constellation diagram is the N2 modulation constellation diagrams. The N2 modulation constellation diagrams include at least one irregular modulation constellation diagram.

For example, the N2 modulation constellation diagrams are all irregular modulation constellation diagrams. For another example, at least one of the N2 modulation constellation diagrams is an irregular modulation constellation diagram, and the other modulation constellation diagrams are conventional constellation diagrams, for example, the foregoing PSK constellation diagram or QAM constellation diagram. For example, N2 is equal to 4, two of the four modulation constellation diagrams are irregular modulation constellation diagrams, and the other two modulation constellation diagrams are any two of a BPSK constellation diagram, a π/2-BPSK modulation constellation diagram, a QPSK constellation diagram, an 8PSK constellation diagram, an 8QAM constellation diagram, a 16QAM constellation diagram, a 64QAM constellation diagram, a 256QAM constellation diagram, and a 1024QAM constellation diagram.

Determining the second modulation constellation includes: determining N2 modulation constellation diagrams, and determining the second modulation constellation diagram from the N2 modulation constellation diagrams. The determining N2 modulation constellation diagrams may also be described as: determining information about the N2 modulation constellation diagrams. In other words, information about each of the N2 modulation constellation diagrams is determined.

Optionally, the N1 modulation constellation diagrams in operation 201 may be modulation constellation diagrams that are set for a first UE type, and a type of the first UE is the first UE type. The N2 modulation constellation diagrams in operation 203 may be modulation constellation diagrams that are set for a second UE type, and a type of the second UE is the second UE type. Optionally, the N1 modulation constellation diagrams and the N2 modulation constellation diagrams may be included in N3 modulation constellation diagrams.

Operation 204 is similar to operation 202, and details are not described.

According to the method, respective modulation constellation diagrams may be set for different UE types, to meet requirements of different types of UE.

In this embodiment of this application, a plurality of UE types may be defined. For example, two or more of the following UE types may be defined: eMBB UE, URLLC UE, IoT UE, D2D UE, customer premises equipment (CPE) UE, AR/VR UE, and V2X UE. Optionally, the IoT UE may include one or more of the following types of UE: MTC UE, narrowband (NB)-IoT UE, mMTC UE, a perceptron, a sensor, and a controller.

For example, UE of different types differs in terms of one or more of the following: mobility, a channel environment in which the UE is located, a scenario in which the UE is located, a feature of a supported service, a price, and power consumption.

For example, UE of different types differs in terms of one or more of the following indicators: a reliability requirement, a latency requirement, a coverage requirement, a battery life requirement, a PAPR, an error vector magnitude (EVM), out-of-band emission, a spectrum emission mask (SEM), an adjacent channel leakage power ratio (ACLR), and an adjacent channel power ratio (ACPR).

For example, the eMBB UE usually can move randomly, and mainly supports an eMBB service. The eMBB UE is located in a relatively complex and changeable channel environment, for example, located outdoors, indoors, in a shopping mall, on a street, or on a high-speed train. Optionally, a data volume of the eMBB service is relatively large, and occasionally, a data volume is relatively small. The eMBB service has relatively low requirements on a latency and reliability. For example, minimum reliability of data packet transmission is required to be $1\text{-}10^{-2}$, that is, a target block error rate (BLER) is $10^{-2}$, and a maximum latency on a user plane is required to be 10 milliseconds (ms) or 5 ms. The eMBB service may include an uplink service and a downlink service. For example, the eMBB UE may be a mobile phone. Requirements on power consumption and an amplifier of the eMBB UE are low. For example, a battery life of the eMBB UE is required to be two to three years.

For example, the URLLC UE usually does not move or has a fixed moving route, and mainly supports a URLLC service. A channel environment in which the URLLC UE is located is relatively stable, for example, a factory or a hospital. A data volume of the URLLC service is relatively small. The URLLC service has relatively high requirements on a latency and reliability. For example, it is required that minimum reliability of data packet transmission is $1\text{-}10^{-5}$, and a maximum latency on a user plane is 0.5 ms or 1 ms. Requirements on power consumption and an amplifier of the URLLC UE are medium. For example, a battery life of the URLLC UE is required to be three to five years.

For example, the IoT UE usually does not move. The IoT UE features strong coverage, low costs, low power consumption, and massive connections. A location of the IoT UE may be known. A channel environment in which the IoT UE is located is relatively stable. For example, the IoT UE is a smart water meter, a smart electricity meter, or a smart household appliance. Because a penetration loss of the smart water meter is relatively high, to meet a communication requirement, a coverage requirement on the IoT UE is relatively high, for example, there is a deep coverage requirement. Optionally, a service of the IoT UE has a relatively small data volume, and is usually an uplink service. For example, a peak rate of the IoT UE is dozens of kilobytes per second (kbps). Based on a low cost requirement, requirements on power consumption and an amplifier of the IoT UE are high. For example, a battery life of the IoT UE is required to be more than ten years or several decades.

For example, the CPE UE (for example, an indoor forwarder) or the AR/VR UE (for example, a device in an AV/VR experience hall) usually does not move, and a channel environment is relatively stable. They mainly support short-distance communication. The CPE UE may have a higher antenna gain, higher power, and stronger signal sending and receiving capabilities than a mobile phone, and can provide high-speed network experience. The CPE UE or the AR/VR UE usually transmits a large data packet. For example, a peak rate of the CPE UE or the AR/VR UE is dozens of gigabits per second (gbps) or hundreds of gbps. Services of these UEs have low requirements on a latency and reliability. For example, it is required that minimum reliability of data packet transmission is $1\text{-}10^{-3}$, and a maximum latency on a user plane is 5 ms. Requirements on power consumption and amplifiers of these UEs are medium. For example, a battery life is required to be five to ten years.

In embodiments of this application, an execution sequence of different operations in the flowcharts is not limited. For example, in the flowchart shown in FIG. 2, operation 203 and operation 204 may be performed before operation 201. For another example, operation 203 is performed before operation 201, and operation 204 is performed after operation 201.

The following describes an irregular modulation constellation diagram in detail. For any irregular modulation constellation diagram A, for example, the first modulation constellation diagram, information about the modulation constellation diagram A may include any one of the following information about a first-type modulation constellation diagram A to information about a third-type modulation constellation diagram A. Manners used for different modulation constellation diagrams may be the same or may be different. This is not limited. Values of constellation points in different modulation constellation diagrams are different.

Information about the first-type modulation constellation diagram A: The modulation constellation diagram A includes M constellation points, M is a positive integer, and the information about the modulation constellation diagram A includes a value range of M1 constellation points in the M constellation points.

Optionally, the value range includes an amplitude range and/or a phase range.

In a possible implementation (denoted as implementation A1), the information about the modulation constellation diagram A includes an amplitude range of the M1 constellation points in the M constellation points. M1 is an integer greater than 0 and less than or equal to M. In other words, M1 is an integer greater than or equal to 1 and less than or equal to M.

Optionally, a phase of each constellation point in the modulation constellation diagram A is specified in a protocol or is fixed. Amplitudes of M2 constellation points in the modulation constellation diagram A are specified in a protocol or are fixed. The M2 constellation points are constellation points other than the M1 constellation points in the modulation constellation diagram A. M2 is an integer greater than or equal to 0 and less than or equal to M.

Optionally, which M1 constellation points in the M constellation points are specifically the M1 constellation points may be specified in a protocol, or may be fixed, or may be notified by the base station to the UE by using signaling.

For example, the M1 constellation points are all constellation points (that is, the M constellation points), or the M1 constellation points are a $p^{th}$ constellation point in the M constellation points (that is, M1=1), or the M1 constellation points are a $q1^{th}$ constellation point to a $q2^{th}$ constellation point in the M constellation points (that is, M1=2). Herein, p is an integer, for example, 1. q1 and q2 are integers. For example, q1 is 1, and q2 is 2.

For example, the base station may indicate, to the UE by using $\lceil \log_2 M \rceil$ bits, which constellation point in the M constellation points is the M1 constellation points, that is, indicate an index of the constellation point. For example, if M is 4, 2 bits may be used to indicate that one of the constellation points is the M1 constellation points. For example, if a value of the $\lceil \log_2 M \rceil$ bits is 00, it indicates that the M1 constellation points are a first constellation point in the M constellation points. 01 indicates that the M1 constellation points are a second constellation point in the M constellation points, 10 indicates that the M1 constellation points are a third constellation point in the M constellation points, and 11 indicates that the M1 constellation points are a fourth constellation point in the M constellation points.

For example, the base station may indicate the M1 constellation points to the UE by using an M-bit bitmap (or referred to as a bitmap). Each bit in the bitmap uniquely corresponds to one of the M constellation points. When a value of the bit is t1, the M1 constellation points include the constellation point corresponding to the bit. When a value of the bit is t2 or is not t1, the M1 constellation points do not include the constellation point corresponding to the bit. Herein, t1 and t2 are integers. For example, t1 is 1, and t2 is 0, or t1 is 0, and t2 is 1.

For example, the M constellation points in the modulation constellation diagram A respectively one-to-one correspond to M constellation points in a reference constellation diagram. A phase of each constellation point in the modulation constellation diagram A is a phase of a constellation point that corresponds to the constellation point and that is in the reference constellation diagram. Values of amplitudes of the M1 constellation points in the modulation constellation diagram A are a first value range (that is, an amplitude range). For each constellation point in the M2 constellation points in the modulation constellation diagram A, an amplitude of the constellation point is an amplitude of a constellation point that corresponds to the constellation point and that is in the reference constellation diagram.

Optionally, in actual application, there is no intersection between different constellation points in the modulation constellation diagram A.

In this embodiment of this application, a value range includes a start value and an end value of the range, a start value and a range value, or an end value and a range value, where the range value indicates a difference between the end value and the start value of the range. Optionally, the value range may include the start value, or may not include the start value; and/or the value range may include the end value, or may not include the end value. This is not limited.

Optionally, for one constellation point (denoted as a constellation point A) in the M1 constellation points, a first value range of an amplitude of the constellation point A is Z1 to Z2, where Z1 and Z2 are real numbers, and Z1 is less than Z2. For example, Z1 is 0.75, and Z2 is 1.25. The range may include Z1, or may not include Z1; and/or the range may include Z2, or may not include Z2. Optionally, all of the M1 constellation points have same Z1 and same Z2. Optionally, independent Z1 and/or Z2 may be set for each of the M1 constellation points. Z1 of different constellation points may be the same or different, and/or Z2 of different constellation points may be the same or different. This is not limited.

Optionally, for a modulation order $Q_m$, $Q_m$ bits: b(Qm*i), b(Qm*i+1), b(Qm*i+2), . . . , b(Qm*i+Qm−1), may be mapped to a modulation symbol d(i)' in a specific range according to the following formula, where the range is determined based on an amplitude range:

$$d(i)' = A_m * \left(\frac{d(i)}{|d(i)|}\right)$$

Herein, a value of $A_m$ is Z1 to Z2, and d(i) is a modulation symbol corresponding to the $Q_m$ bits in a reference modulation constellation diagram.

For example, for a modulation order 2, 2 bits: b(i), b(i+1), may be mapped to a modulation symbol d(i)' in a specific range according to the following formula, where the range is determined based on an amplitude range, and an amplitude value of d(i) is 1:

$$d(i)'=A_m*d(i)$$

Herein, a value of $A_m$ is Z1 to Z2, and d(i) is a modulation symbol corresponding to the 2 bits in a reference modulation constellation diagram.

Optionally, for one constellation point (denoted as a constellation point A) in the M1 constellation points, a first value range of an amplitude of the constellation point A is an amplitude extension range of the constellation point A relative to a constellation point B that corresponds to the constellation point A and that is in the reference constellation diagram. To be specific, the start value in the foregoing method may be replaced with an offset value or an extension value of the start value relative to an amplitude of a corresponding constellation point in the reference constellation diagram. Optionally, the end value in the method may be replaced with an offset value or an extension value of the end value relative to an amplitude of a corresponding constellation point in the reference constellation diagram.

For example, the first value range of the amplitude of the constellation point A is W−Z3 to W+Z4, where Z3 may be referred to as a left extended range, and Z4 may be referred to as a right extended range. The first value range may include W−Z3, or may not include W−Z3; and/or the first value range may include W+Z4, or may not include W+Z4. W is an amplitude of the constellation point B. Z3 and Z4 are real numbers. For example, Z3 is 0.2, and Z4 is 0.2. Values of Z3 and Z4 may be the same or may be different. W−Z3 to W+Z4 may include W, or may not include W (for example, when Z3 is less than 0 and Z4 is greater than 0). Optionally, W−Z3 may be replaced with W+Z3, and W+Z4 may be replaced with W−Z4.

Optionally, for a modulation order $Q_m$, $Q_m$ bits: b(Qm*i), b(Qm*i+1), b(Qm*i+2), . . . , b(Qm*i+Qm−1), may be mapped to a modulation symbol d(i)' in a specific range according to the following formula, where the range is determined based on an amplitude range:

$$d(i)' = A_m * \left(\frac{d(i)}{|d(i)|}\right)$$

Herein, a value of $A_m$ is W−Z3 to W+Z4, d(i) is a modulation symbol corresponding to the $Q_m$ bits in the reference modulation constellation diagram, and W is an amplitude value of the modulation symbol corresponding to the $Q_m$ bits in the reference modulation constellation diagram. In this embodiment of this application, || represents a modulo operation. Optionally, all of the M1 constellation points have same Z3 and same Z4. Z3 and Z4 may be the same or may be different. As shown in FIG. 3(*b*) and FIG. 3(*c*), Z3 of each constellation point is R1, and Z4 of each constellation point is also R1.

Optionally, Z3 may be independently set for each of the M1 constellation points, and Z3 of different constellation points may be the same or may be different. Optionally, all of the M1 constellation points have same Z4. Alternatively, Z4 may be independently set for each of the M1 constellation points, and Z4 of different constellation points may be the same or may be different.

In this embodiment of this application, the reference constellation diagram may be a constellation diagram specified in a protocol, such as a BPSK constellation diagram, a π/2-BPSK modulation constellation diagram, a QPSK modulation constellation diagram, a 16QAM constellation diagram, a 64QAM constellation diagram, a 256QAM constellation diagram, or a 1024QAM constellation diagram. Alternatively, the reference constellation diagram is a constellation diagram preconfigured by the base station for the UE by using signaling. Optionally, an order of the modulation constellation diagram A is the same as an order of a reference constellation point corresponding to the modulation constellation diagram A.

An order of a modulation constellation diagram indicates a quantity of bits in bit information corresponding to each constellation point in the modulation constellation diagram. A quantity (for example, M) of constellation points in the modulation constellation diagram is 2 raised to the power of n, where n is the order of the modulation constellation diagram. For example, if a modulation constellation diagram includes 16 constellation points, an order of the modulation constellation diagram is 4. A value of n is a positive integer. For example, n is equal to 1, 2, 3, 4, 6, or 8. Optionally, n may be less than or equal to a threshold, and the threshold is a positive integer. For example, the threshold is equal to 10.

Optionally, a threshold value may be independently set for each UE type. For example, there is a correspondence between the threshold and the UE type. The correspondence may be specified in a protocol, or indicated by the base station to the UE by using signaling, or indicated by a core network to the UE by using signaling. This is not limited.

Thresholds corresponding to different UE types may be the same, or may be different. For example, a UE type 1 corresponds to a threshold 1, a UE type 2 corresponds to a threshold 2, and by analogy, a UE type X corresponds to a threshold X.

For example, a threshold of eMBB UE is 8, a threshold of URLLC UE is 6, a threshold of CPE UE is 8, and a threshold of IoT UE is 2 or 4.

In the foregoing manner, thresholds corresponding to different UE types are designed, and a modulation order range applicable to an irregular modulation constellation diagram is determined by considering requirements of different UE types, so that complexity of determining a constellation diagram can be reduced, and communication performance can be improved. In addition, a terminal-type-level or terminal-level modulation constellation diagram can be implemented, to meet requirements of different terminals, and improve communication performance.

In this embodiment of this application, signaling sent by the base station to the UE may be higher layer signaling or physical layer signaling. For example, the signaling may be a master information block (MIB), a system information block (SIB), radio resource control RRC) signaling, a media access control (MAC) control element (CE), or downlink control information (DCI).

A 2-order modulation constellation diagram is used as an example. FIG. 3(*a*) shows a reference constellation diagram. For example, the reference constellation diagram is a QPSK constellation diagram. FIG. 3(*b*) and FIG. 3(*c*) each are a schematic diagram of a modulation constellation diagram A.

As shown in FIG. 3(*a*), QPSK includes four constellation points in total. As shown by black dots in FIG. 3(*a*), the four constellation points are evenly distributed on a unit circle. Complex values of the four constellation points are respectively $$\frac{\sqrt{2}}{2}+\frac{\sqrt{2}}{2}j,\ \frac{-\sqrt{2}}{2}+\frac{\sqrt{2}}{2}j,\ \frac{-\sqrt{2}}{2}+\frac{-\sqrt{2}}{2}j,\text{ and }\frac{\sqrt{2}}{2}+\frac{-\sqrt{2}}{2}j,$$

and bit information corresponding to the constellation points is respectively 00, 01, 11, and 10. Herein, j represents an imaginary unit, and a square of j is equal to −1. For example, when to-be-sent bit information is θ1, a transmit end maps 01 to a modulation symbol $$\frac{-\sqrt{2}}{2}+\frac{\sqrt{2}}{2}j,$$

and sends the modulation symbol to a receive end. Compared with the sent modulation symbol, a modulation symbol received by the receive end may have a phase and/or amplitude change. The receive end demodulates the received modulation symbol. If the receive end learns, through operation by using an algorithm, that the transmit end sends $$\frac{-\sqrt{2}}{2}+\frac{\sqrt{2}}{2}j,$$

for example, if the receive end learns, by calculating a log-likelihood ratio (LLR), that an error between a demodulated modulation symbol and $$\frac{-\sqrt{2}}{2}+\frac{\sqrt{2}}{2}j$$

is the smallest, or a probability of sending $$\frac{-\sqrt{2}}{2}+\frac{\sqrt{2}}{2}j$$

by the transmit end that is calculated by the receive end is the highest, the receive end may obtain the bit information 01 through demodulation. Optionally, a demodulation error may occur at the receive end. For example, if the receive end considers that the transmit end sends $$\frac{\sqrt{2}}{2}+\frac{\sqrt{2}}{2}j,$$

the receive end may obtain the bit information 00 through demodulation. As shown in FIG. 3(*b*), four constellation points in the modulation constellation diagram A respectively one-to-one correspond to the four constellation points in the QPSK constellation diagram. A phase of each constellation point in the modulation constellation diagram A is the same as a phase of a constellation point that corresponds to the constellation point and that is in the QPSK constellation diagram. An amplitude extension range of an amplitude of each constellation point in the modulation constellation diagram A relative to an amplitude of the constellation point that corresponds to the constellation point and that is in the QPSK constellation diagram is 2*R1, that is, the amplitude of the constellation point is extended by R1 on two sides (as shown by a straight line segment in FIG. 3(*b*)). Four black dots in FIG. 3(*b*) show the four constellation points in the QPSK constellation diagram, and four straight line segments respectively show the four constellation points in the modulation constellation diagram A.

As shown in FIG. 3(*c*), four constellation points in the modulation constellation diagram A respectively one-to-one correspond to the four constellation points in the QPSK constellation diagram. A phase of each constellation point in the modulation constellation diagram A is the same as a phase of a constellation point that corresponds to the constellation point and that is in the QPSK constellation diagram. Amplitudes of two constellation points in the modulation constellation diagram A are respectively the same as amplitudes of constellation points that correspond to the constellation points and that are in the QPSK constellation diagram, and amplitude extension ranges of amplitudes of the other two constellation points in the modulation constellation diagram A relative to constellation points that correspond to the constellation points and that are in the QPSK constellation diagram are 2*R1 (as shown by a straight line segment in FIG. 3(*c*)).

R1 is a real number greater than or equal to 0, for example, 0.2, 0.5, or another value. Amplitude extension ranges of different constellation points in the modulation constellation diagram A may be the same or may be different. This is not limited.

Optionally, a value of R1 is less than a Euclidean distance between constellation points.

In this method, for a constellation point in the reference constellation diagram, the constellation point is extended into a straight line segment. A length of the line segment corresponds to an extension range. Points on the line segment correspond to extended constellation points. The points on the line segment may be referred to as a group of constellation points. For example, before extension, complex values of the four constellation points in the QPSK constellation diagram are respectively $$\frac{\sqrt{2}}{2}+\frac{\sqrt{2}}{2}j,\ \frac{-\sqrt{2}}{2}+\frac{\sqrt{2}}{2}j,\ \frac{-\sqrt{2}}{2}+\frac{-\sqrt{2}}{2}j,\text{ and }\frac{\sqrt{2}}{2}+\frac{-\sqrt{2}}{2}j,$$

and bit information corresponding to the constellation points is sequentially 00, 01, 11, and 10. After extension, complex value ranges of the four constellation points in the modulation constellation diagram A are respectively points on a straight line segment into which $$\frac{\sqrt{2}}{2}+\frac{\sqrt{2}}{2}j$$

is extended, points on a straight line segment into which $$\frac{-\sqrt{2}}{2}+\frac{\sqrt{2}}{2}j$$

is extended, points on a straight line segment into which $$\frac{-\sqrt{2}}{2}+\frac{-\sqrt{2}}{2}j$$

is extended, and points on a straight line segment into which $$\frac{\sqrt{2}}{2}+\frac{-\sqrt{2}}{2}j$$

is extended, and bit information corresponding to the constellation points is sequentially 00, 01, 11, and 10.

Optionally, a plurality of amplitude ranges may be configured for a same UE type. For example, a plurality of ranges {Z1, Z2} are configured, or a plurality of amplitude extension ranges {Z3, Z4} are configured. The configuration may be specified in a protocol, or indicated by the base station to the UE by using signaling, or indicated by a core network to the UE by using signaling. This is not limited. For example, for the first UE type in the method shown in FIG. 2, three amplitude extension ranges may be configured, which are respectively 0.4, 0.5, and 0.6. Three constellation diagrams corresponding to the three extension ranges may be included in N1 modulation constellation diagrams corresponding to the first UE type.

Optionally, for various UE types, an amplitude range corresponding to each UE type may be configured. For example, {Z1, Z2} corresponding to each UE type is configured, or an amplitude extension range {Z3, Z4} corresponding to each UE type is configured. Amplitude ranges corresponding to different UE types may be the same or may be different. The configuration may be specified in a protocol, or indicated by the base station to the UE by using signaling, or indicated by a core network to the UE by using signaling. This is not limited. The configuration may be considered as a correspondence between a UE type and an amplitude range. Optionally, there is a correspondence between a type of a terminal and an amplitude range. The base station and/or the UE may determine an amplitude range of the UE according to the correspondence. Determining an amplitude range of a constellation diagram based on a UE type can restrict behavior of the transmit end, and enable the receive end to have priori knowledge, so that demodulation performance is improved.

The following Table 1, Table 2-1, and Table 2-2 each show an example of a correspondence between a UE type and an amplitude range. In this embodiment of this application, the correspondence between a UE type and an amplitude range may include at least one row and/or at least one column in Table 1, Table 2-1, or Table 2-2.

TABLE 1

| UE type | Amplitude extension range | Amplitude range |
|---|---|---|
| Type 1 | {Z31, Z41} | Z11 to Z21 |
| Type 2 | {Z32, Z42} | Z12 to Z22 |
| Type 3, type 4 | {Z33, Z43} | Z13 to Z23 |
| . . . | . . . | . . . |
| Type X | {Z3X, Z4X} | Z1X to Z2X |

X is a positive integer. Any one of the type 1 to the type X may be one of the UE types mentioned above, for example, may be eMBB UE, URLLC UE, IoT UE, CPE UE, V2X UE, AR UE, or VR UE.

TABLE 2-1

Example in which a reference constellation diagram is QPSK

| UE type | Amplitude extension range (R1, that is, an example in which Z3 is equal to Z4 is used) | Amplitude range (which may include or may not include a left endpoint, and may include or may not include a right endpoint, which is not limited) |
|---|---|---|
| eMBB UE | 0.5 | 0.5 to 1.5 |
| URLLC UE | 0.25 | 0.75 to 1.25 |
| CPE UE | 0.75 | 0.25 to 1.75 |
| IoT UE | 0.25 | 0.25 to 1.75 |

TABLE 2-2

Example in which a reference constellation diagram is QPSK

| UE type | Amplitude extension range {Z3, Z4} | Amplitude range (which may include or may not include a left endpoint, and may include or may not include a right endpoint, which is not limited) |
|---|---|---|
| eMBB UE | {0.5, 0.2} | 0.5 to 1.2 |
| URLLC UE | {0.75, 0.25} | 0.25 to 1.25 |
| CPE UE | {0.75, 0.5} | 0.25 to 1.5 |
| IoT UE | {0.5, 0.75} | 0.5 to 1.75 |

In a possible implementation (denoted as implementation A2), the information about the modulation constellation diagram A includes a phase range of the M1 constellation points in the M constellation points. M1 is an integer greater than 0 and less than or equal to M. In other words, M1 is an integer greater than or equal to 1 and less than or equal to M.

Optionally, an amplitude of each constellation point in the modulation constellation diagram A is specified in a protocol or is fixed. Phases of M2 constellation points in the modulation constellation diagram A are specified in a protocol or are fixed. The M2 constellation points are constellation points other than the M1 constellation points in the modulation constellation diagram A. M2 is an integer greater than or equal to 0 and less than or equal to M.

A method for determining which constellation point or constellation points is/are specifically the M1 constellation points is the same as that described in the foregoing implementation A1. Details are not described herein again.

For example, the M constellation points in the modulation constellation diagram A respectively one-to-one correspond to M constellation points in a reference constellation diagram. An amplitude of each constellation point in the modulation constellation diagram A is an amplitude of a constellation point that corresponds to the constellation point and that is in the reference constellation diagram. Values of phases of the M1 constellation points in the modulation constellation diagram A are a second value range (that is, a phase range). For each constellation point in the M2 constellation points in the modulation constellation diagram A, a phase of the constellation point is a phase of a constellation point that corresponds to the constellation point and that is in the reference constellation diagram.

Optionally, for one constellation point (denoted as a constellation point A) in the M1 constellation points, a second value range of a phase of the constellation point A is θ1 to θ2, where θ1 and θ2 are real numbers. For example, θ1 or θ2 is 5°, 15°, 30°, or another value; or $$\frac{\pi}{3}, \frac{\pi}{4}, \frac{\pi}{6}, -\frac{\pi}{3}, -\frac{\pi}{6},$$

or another value. The range may include θ1 or may not include θ1; and/or the range may include θ2 or may not include θ2. Optionally, all of the M1 constellation points have same θ1 and same θ2. Optionally, independent θ1 and/or θ2 may be set for each of the M1 constellation points. θ1 of different constellation points may be the same or different, and/or θ2 of different constellation points may be the same or different. This is not limited.

Optionally, for a modulation order $Q_m$, $Q_m$ bits: b(Qm*i), b(Qm*i+1), b(Qm*i+2), . . . , b(Qm*i+Qm−1), may be mapped to a modulation symbol d(i)' in a specific range according to the following formula, where the range is determined based on a phase range:

$$d(i)'=d(i)*e^{j*\theta}$$

A value of θ is a value satisfying that a phase of the modulation constellation point is θ1 to θ2. d(i) is a modulation symbol corresponding to the $Q_m$ bits in the reference modulation constellation diagram, j represents an imaginary unit, and a square of j is equal to −1.

Optionally, for one constellation point (denoted as a constellation point A) in the M1 constellation points, a second value range of a phase of the constellation point A is a phase extension range of the constellation point A relative to a constellation point B that corresponds to the constellation point A and that is in the reference constellation diagram. To be specific, the start value in the foregoing method may be replaced with an offset value or an extension value of the start value relative to a phase of a corresponding constellation point in the reference constellation diagram. Optionally, the end value in the method may be replaced with an offset value or an extension value of the end value relative to a phase of a corresponding constellation point in the reference constellation diagram.

For example, the second value range of the phase of the constellation point A is $\theta_r$−θ3 to $\theta_r$+θ4, where θ3 may be referred to as a left extension range, and θ4 may be referred to as a right extension range. The second value range may include $\theta_r$−θ3 or may not include $\theta_r$−θ3; and/or the second value range may include $\theta_r$+θ4 or may not include $\theta_r$+θ4. Herein, $\theta_r$ is the phase of the constellation point B. Herein, θ3 and θ4 are real numbers. Values of θ3 and θ4 may be the same or may be different. $\theta_r$−θ3 to $\theta_r$+θ4 may include $\theta_r$ or may not include $\theta_r$ (for example, when θ3 is less than 0 and Z4 is greater than 0). Optionally, $\theta_r$−θ3 may be replaced with $\theta_r$+θ3, and $\theta_r$+θ4 may be replaced with $\theta_r$−θ4.

Optionally, for a modulation order $Q_m$, $Q_m$ bits: b(Qm*i), b(Qm*i+1), b(Qm*i+2), . . . , b(Qm*i+Qm−1), may be mapped to a modulation symbol d(i)' in a specific range according to the following formula, where the range is determined based on a phase range:

$$d(i)'=d(i)*e^{j*\theta}$$

Herein, a value of θ is −θ3 to θ4, d(i) is a modulation symbol corresponding to the $Q_m$ bits in the reference modulation constellation diagram, j represents an imaginary unit, and a square of j is equal to −1.

Optionally, all of the M1 constellation points have same θ3 and same θ4. θ3 and θ4 may be the same or may be different. As shown in FIG. 3(*d*) and FIG. 3(*e*), θ3 of each constellation point is R2, and θ4 of each constellation point is also R2.

Optionally, θ3 may be independently set for each of the M1 constellation points, and θ3 of different constellation points may be the same or may be different. Optionally, all of the M1 constellation points have same θ4. Alternatively, θ4 may be independently set for each of the M1 constellation points, and θ4 of different constellation points may be the same or may be different.

A 2-order modulation constellation diagram is used as an example. FIG. 3(*a*) shows a reference constellation diagram. The reference constellation diagram is a QPSK constellation diagram. FIG. 3(*d*) and FIG. 3(*e*) each are a schematic diagram of a modulation constellation diagram A.

For description of FIG. 3(*a*), refer to the foregoing description. Details are not described herein again.

As shown in FIG. 3(*d*), four constellation points in the modulation constellation diagram A respectively one-to-one correspond to the four constellation points in the QPSK constellation diagram. An amplitude of each constellation point in the modulation constellation diagram A is the same as an amplitude of a constellation point that corresponds to the constellation point and that is in the QPSK constellation diagram. A phase extension range of a phase of each constellation point in the modulation constellation diagram A relative to a phase of the constellation point that corresponds to the constellation point and that is in the QPSK constellation diagram is 2*R2, that is, the phase of the constellation point is extended by R2 on two sides (as shown by an arc line segment in FIG. 3(*d*)). Four black dots in FIG. 3(*d*) show the four constellation points in the QPSK constellation diagram, and four arc line segments respectively show the four constellation points in the modulation constellation diagram A.

As shown in FIG. 3(*e*), four constellation points in the modulation constellation diagram A respectively one-to-one correspond to the four constellation points in the QPSK constellation diagram. An amplitude of each constellation point in the modulation constellation diagram A is the same as an amplitude of a constellation point that corresponds to the constellation point and that is in the QPSK constellation diagram. Phases of two constellation points in the modulation constellation diagram A are respectively the same as phases of two constellation points that correspond to the two constellation points and that are in the QPSK constellation diagram, and phase extension ranges of phases of the other two constellation points in the modulation constellation diagram A relative to constellation points that correspond to the constellation points and that are in the QPSK constellation diagram are 2*R2 (as shown by an arc line segment in FIG. 3(*e*)).

Optionally, for a modulation order $Q_m$, $Q_m$ bits: b(Qm*i), b(Qm*i+1), b(Qm*i+2), . . . , b(Qm*i+Qm−1), may be mapped to a modulation symbol d(i)' in a specific range according to the following formula, where the range is determined based on a second value range of a phase:

$$d(i)'=d(i)*e^{j*\theta}$$

Herein, a value of θ is −R2 to R2, d(i) is a modulation symbol corresponding to the $Q_m$ bits in the reference modulation constellation diagram, j represents an imaginary unit, and a square of j is equal to −1.

R2 is a real number greater than or equal to 0. For example, R2 is 15°, 20°, 30°, 45°, or another value; or $$\frac{\pi}{3}, \frac{\pi}{4}, \frac{\pi}{6},$$

or another value. Phase extension ranges of different constellation points in the modulation constellation diagram A may be the same or may be different. This is not limited.

Optionally, a value of R2 is less than a phase difference between adjacent constellation points.

In this method, for a constellation point in the reference constellation diagram, the constellation point is extended into an arc line segment. A length of the line segment corresponds to an extension range. Points on the line segment correspond to extended constellation points. The points on the line segment may be referred to as a group of constellation points. For example, before extension, complex values of the four constellation points in the QPSK constellation diagram are respectively $$\frac{\sqrt{2}}{2}+\frac{\sqrt{2}}{2}j,\ \frac{-\sqrt{2}}{2}+\frac{\sqrt{2}}{2}j,\ \frac{-\sqrt{2}}{2}+\frac{-\sqrt{2}}{2}j,\text{ and }\frac{\sqrt{2}}{2}+\frac{-\sqrt{2}}{2}j,$$

and bit information corresponding to the constellation points is sequentially 00, 01, 11, and 10. After extension, complex value ranges of the four constellation points in the modulation constellation diagram A are respectively points on an arc line segment into which $$\frac{\sqrt{2}}{2}+\frac{\sqrt{2}}{2}j$$

is extended, points on an arc line segment into which $$\frac{-\sqrt{2}}{2}+\frac{\sqrt{2}}{2}j$$

is extended, points on an arc line segment into which $$\frac{-\sqrt{2}}{2}+\frac{-\sqrt{2}}{2}j$$

is extended, and points on an arc line segment into which $$\frac{\sqrt{2}}{2}+\frac{-\sqrt{2}}{2}j$$

is extended, and bit information corresponding to the constellation points is sequentially 00, 01, 11, and 10.

Optionally, a plurality of phase ranges may be configured for a same UE type. For example, a plurality of ranges {θ1, θ2} are configured, or a plurality of phase extension ranges {θ3, θ4} are configured. The configuration may be specified in a protocol, or indicated by the base station to the UE by using signaling, or indicated by a core network to the UE through the base station. This is not limited. For example, for the first UE type in the method shown in FIG. 2, three phase extension ranges may be configured, which are respectively 5°, 15°, and 30°; or $$\frac{\pi}{3},\ \frac{\pi}{4},\text{ and }\frac{\pi}{6}.$$

Three constellation diagrams corresponding to the three extension ranges may be included in N1 modulation constellation diagrams corresponding to the first UE type.

Optionally, for various UE types, a phase range corresponding to each UE type may be configured. For example, {θ1, θ2} corresponding to each UE type is configured, or a phase extension range {θ3, θ4} corresponding to each UE type is configured. Phase ranges corresponding to different UE types may be the same or may be different. The configuration may be specified in a protocol, or indicated by the base station to the UE by using signaling, or indicated by a core network to the UE by using signaling. This is not limited. The configuration may be considered as a correspondence between a UE type and a phase range. Optionally, there is a correspondence between a type of a terminal and a phase range. The base station and/or the UE may determine a phase range of the UE according to the correspondence. Determining a phase range of a constellation diagram based on a UE type can restrict behavior of the transmit end, and enable the receive end to have priori knowledge, so that demodulation performance is improved.

Table 3, Table 4-1, and Table 4-2 each show an example of a correspondence between a UE type and a phase range. In this embodiment of this application, the correspondence between a UE type and a phase range may include at least one row and/or at least one column in the following table:

TABLE 3

| UE type | Phase extension range | Phase range |
|---|---|---|
| Type 1 | {θ31, θ41} | θ11 to θ21 |
| Type 2, type 3 | {θ32, θ42} | θ12 to θ22 |
| Type 4 | {θ33, θ43} | θ13 to θ23 |
| . . . | . . . | . . . |
| Type X | {θ3X, θ4X} | θ1X to θ2X |

The type 1 to the type X each may be one of the types mentioned above, for example, an eMBB terminal, a URLLC terminal, an IoT terminal, CPE, a V2X terminal, an AR terminal, or a VR terminal.

TABLE 4-1

| Example in which a reference constellation diagram is QPSK | | |
|---|---|---|
| UE type | Phase extension range (R2, that is, an example in which θ3 is equal to θ4 is used) | Phase range (which may include or may not include a left endpoint, and may include or may not include a right endpoint, which is not limited) |
| eMBB UE | 5° | 40° to 50° (first constellation point), 130° to 140° (second constellation point), 220° to 230° (third constellation point), and 310° to 320° (fourth constellation point) |
| URLLC UE | 15° | 30° to 60° (first constellation point), 120° to 150° (second constellation point), 210° to 240° (third constellation point), and 300° to 330° (fourth constellation point) |

TABLE 4-1-continued

| Example in which a reference constellation diagram is QPSK | | |
|---|---|---|
| UE type | Phase extension range (R2, that is, an example in which θ3 is equal to θ4 is used) | Phase range (which may include or may not include a left endpoint, and may include or may not include a right endpoint, which is not limited) |
| CPE UE | 30° | 15° to 75° (first constellation point), 105° to 165° (second constellation point), 195° to 255° (third constellation point), and 285° to 345° (fourth constellation point) |
| IoT UE | 0° (that is, no extension) | 45° (first constellation point), 135° (second constellation point), 225° (third constellation point), and 315° (fourth constellation point) |

TABLE 4-2

| Example in which a reference constellation diagram is QPSK | | |
|---|---|---|
| UE type | Phase extension range {θ3, θ4} | Phase range (which may include or may not include a left endpoint, and may include or may not include a right endpoint, which is not limited) |
| eMBB UE | {15°, 10°} | 30° to 55° (first constellation point), 120° to 145° (second constellation point), 210° to 235° (third constellation point), and 300° to 325° (fourth constellation point) |
| URLLC UE | {5°, 10°} | 40° to 55° (first constellation point), 130° to 145° (second constellation point), 220° to 235° (third constellation point), and 310° to 325° (fourth constellation point) |
| CPE UE | {30°, 30°} | 15° to 75° (first constellation point), 105° to 165° (second constellation point), 195° to 255° (third constellation point), and 285° to 345° (fourth constellation point) |
| IoT UE | {0, 5°} | 45° to 50° (first constellation point), 135° to 140° (second constellation point), 225° to 230° (third constellation point), and 315° to 320° (fourth constellation point) |

In a possible implementation (denoted as implementation A3), the information about the modulation constellation diagram A includes an amplitude range and a phase range of the M1 constellation points in the M constellation points.

Implementation A3 may be considered as a combination of implementation A1 and implementation A2 described above.

Optionally, phases and amplitudes of M2 constellation points in the modulation constellation diagram A are specified in a protocol or are fixed. The M2 constellation points are constellation points other than the M1 constellation points in the modulation constellation diagram A.

For example, the M constellation points in the modulation constellation diagram A respectively one-to-one correspond to M constellation points in a reference constellation diagram. Values of amplitudes of the M1 constellation points in the modulation constellation diagram A are a first value range (that is, an amplitude range), and values of phases of the M1 constellation points are a second value range (that is, a phase range). For each constellation point in the M2 constellation points in the modulation constellation diagram A, an amplitude and a phase of the constellation point are an amplitude and a phase of a constellation point that corresponds to the constellation point and that is in the reference constellation diagram.

Optionally, for example, the amplitude range of the M1 constellation points is Z1 to Z2, and the phase range of the M1 constellation points is $\theta_r-\theta3$ to $\theta_r+\theta4$. For a modulation order $Q_m$, $Q_m$ bits: b(Qm*i), b(Qm*i+1), b(Qm*i+2), . . . , b(Qm*i+Qm−1), may be mapped to a modulation symbol d(i)' in a specific range according to the following formula, where the range is determined based on an amplitude range and a phase range:

$$d(i)' = A_m * \left(\frac{d(i)}{|d(i)|}\right) * e^{j*\theta}$$

A value of $A_m$ is Z1 to Z2, a value of θ is −θ3 to θ4, d(i) is a modulation symbol corresponding to the $Q_m$ bits in the reference modulation constellation diagram, and $\theta_r$ is a phase of the modulation symbol corresponding to the $Q_m$ bits in the reference modulation constellation diagram.

For example, for a modulation order 2, 2 bits: b(i), b(i+1), may be mapped to a modulation symbol d(i)' in a specific range according to the following formula, where the range is determined based on an amplitude range and a phase range, and an amplitude value of d(i) is 1:

$$d(i)'=A_m*d(i)*e^{j*\theta}$$

A value of $A_m$ is Z1 to Z2, a value of θ is −θ3 to θ4, d(i) is a modulation symbol corresponding to the 2 bits in the reference modulation constellation diagram, and $\theta_r$ is a phase of the modulation symbol corresponding to the $Q_m$ bits in the reference modulation constellation diagram.

A 2-order modulation constellation diagram is used as an example. FIG. 3(*a*) shows a reference constellation diagram. The reference constellation diagram is a QPSK constellation diagram. FIG. 3(*f*) and FIG. 3(*g*) each are a schematic diagram of a modulation constellation diagram A.

For description of FIG. 3(*a*), refer to the foregoing description. Details are not described herein again.

FIG. 3(*f*) shows a combination of FIG. 3(*b*) and FIG. 3(*d*); and FIG. 3(*g*) shows a combination of FIG. 3(*c*) and FIG. 3(*e*). Four black dots in FIG. 3(*f*) show four constellation points in the QPSK constellation diagram, and four sectors respectively show four constellation points in the modulation constellation diagram A.

In FIG. 3(*f*) and FIG. 3(*g*), for each constellation point in the modulation constellation diagram A, amplitude extension ranges corresponding to all phases are the same. However, this is not limited in this embodiment of this application. In this embodiment of this application, an extension range and an extension result of a constellation point in the reference constellation diagram are not limited, that is, a specific value range of a constellation point in the modulation constellation diagram A is not limited.

Optionally, for one constellation point (denoted as a constellation point A) in the M1 constellation points in the modulation constellation diagram A, the constellation point A (or referred to as the group of constellation points A) is a pattern. The pattern may also be described as an extension pattern of the constellation point A relative to a constellation point B that corresponds to the constellation point A and that is in the reference constellation diagram. The extension pattern may include or may not include the constellation point B. This is not limited. The extension pattern may be a regular rectangle, a square, a circle, or another polygon, or may be an irregular image. This is not limited. For each constellation point in the M2 constellation points in the modulation constellation diagram A, an amplitude and a phase of the constellation point are an amplitude and a phase of a constellation point that corresponds to the constellation point and that is in the reference constellation diagram. Information about the constellation point A includes information about an extension pattern corresponding to the constellation point, such as a side length, a center point, a radius, a polar coordinate angle, and/or a diagonal length.

Optionally, each constellation point in the reference constellation diagram may be extended, or some constellation points may be extended, to obtain the modulation constellation diagram A. Optionally, shapes of extension patterns of different constellation points may be the same or may be different. When different constellation points are corresponding to extension patterns of a same shape, sizes of the extension patterns may be the same or may be different.

Figure 4A:
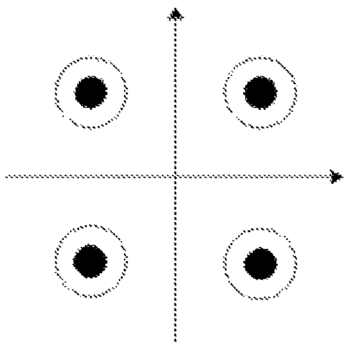
Figure 4B:
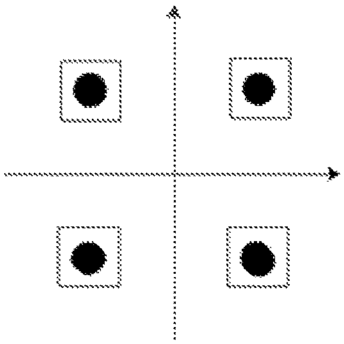
Figure 4C:
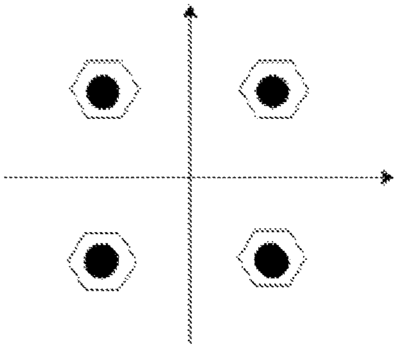

For example, a 2-order modulation constellation diagram is used as an example. FIG. 4(*a*), FIG. 4(*b*), and FIG. 4(*c*) are other possible schematic diagrams of the modulation constellation diagram A.

For example, for a constellation point in a QPSK constellation diagram, as shown in FIG. 4(*a*), the constellation point may be extended into a circle centered on the constellation point. For example, the information about the modulation constellation diagram A may include a radius of the circle into which the constellation point is extended. Four black dots in FIG. 4(*a*) show four constellation points in the QPSK constellation diagram, and four circles respectively show four constellation points in the modulation constellation diagram A.

For example, as shown in FIG. 4(*b*), the constellation point may be extended into a square centered on the constellation point. For example, the information about the modulation constellation diagram A may include a side length or a diagonal length of the square into which the constellation point is extended. Four black dots in FIG. 4(*b*) show four constellation points in the QPSK constellation diagram, and four squares respectively show four constellation points in the modulation constellation diagram A.

For example, as shown in FIG. 4(*c*), the constellation point may be extended into a hexagon centered on the constellation point. For example, the information about the modulation constellation diagram A may include a side length or a diagonal length of the hexagon into which the constellation point is extended. Four black dots in FIG. 4(*c*) show four constellation points in the QPSK constellation diagram, and four hexagons respectively show four constellation points in the modulation constellation diagram A.

Optionally, for a same UE type, a plurality of types of {amplitude range, phase range} or a plurality of pieces of pattern information may be configured. The configuration may be specified in a protocol, or indicated by the base station to the UE by using signaling, or indicated by a core network to the UE by using signaling. This is not limited. For example, for the first UE type in the method shown in FIG. 2, three types of {amplitude range, phase range} may be configured, and three constellation diagrams corresponding to the three types of {amplitude range, phase range} may be included in N1 modulation constellation diagrams corresponding to the first UE type.

Optionally, for various UE types, {amplitude range, phase range} or pattern information corresponding to each UE type may be configured. {Amplitude range, phase range} corresponding to different UE types may be the same or may be different. The configuration may be specified in a protocol, or indicated by the base station to the UE by using signaling, or indicated by a core network to the UE by using signaling. This is not limited. The configuration may be considered as a correspondence between a UE type and {amplitude range, phase range}. Optionally, there is a correspondence between a UE type and {amplitude range, phase range}. The base station and/or the UE may determine {amplitude range, phase range} of the UE according to the correspondence. Determining {amplitude range, phase range} of a constellation diagram based on a UE type can restrict behavior of the transmit end, and enable the receive end to have priori knowledge, so that demodulation performance is improved.

Table 5, Table 6-1, and Table 6-2 each show an example of a correspondence between a UE type and {amplitude range, phase range}. In this embodiment of this application, the correspondence between a UE type and {amplitude range, phase range} may include at least one row and/or at least one column in the following table:

TABLE 5

| UE type | Amplitude extension range, phase extension range | Amplitude range, phase range |
|---|---|---|
| Type 1 | {Z31, Z41}, {θ31, θ41} | Z11 to Z21, θ11 to θ21 |
| Type 2 | {Z32, Z42}, {θ32, θ42} | Z12 to Z22, θ12 to θ22 |
| Type 3 | {Z33, Z43}, {θ33, θ43} | Z13 to Z23, θ13 to θ23 |
| Type 4 | {Z34, Z44}, {θ34, θ44} | Z14 to Z24, θ14 to θ24 |
| . . . | . . . | . . . |
| Type X | {Z3X, Z4X}, {θ3X, θ4X} | Z1X to Z2X, θ1X to θ2X |

The type 1 to the type X each may be one of the types mentioned above, for example, an eMBB terminal, a URLLC terminal, an IoT terminal, CPE, a V2X terminal, an AR terminal, or a VR terminal.

TABLE 6-1

| Example in which a reference constellation diagram is QPSK | | | | |
|---|---|---|---|---|
| UE type | Amplitude extension range (R1) | Amplitude range (which may include or may not include a left endpoint, and may include or may not include a right endpoint, which is not limited) | Phase extension range (R2) | Phase range (which may include or may not include a left endpoint, and may include or may not include a right endpoint, which is not limited) |
| eMBB UE | 0.5 | 0.5 to 1.5 | 5° | 40° to 50° (first constellation point), 130° to 140° (second constellation point), 220° to 230° (third constellation point), and 310° to 320° (fourth constellation point) |
| URLLC UE | 0.25 | 0.75 to 1.25 | 15° | 30° to 60° (first constellation point), 120° to 150° (second constellation point), 210° to 240° (third constellation point), and 300° to 330° (fourth constellation point) |
| CPE UE | 0.75 | 0.25 to 1.75 | 30° | 15° to 75° (first constellation point), 105° to 165° (second constellation point), 195° to 255° (third constellation point), and 285° to 345° (fourth constellation point) |
| IoT UE | 0.25 | 0.25 to 1.75 | 0° (that is, no extension) | 45° (first constellation point), 135° (second constellation point), 225° (third constellation point), and 315° (fourth constellation point) |

TABLE 6-2

| Example in which a reference constellation diagram is QPSK | | | | |
|---|---|---|---|---|
| UE type | Amplitude extension range {Z3, Z4} | Amplitude range (which may include or may not include a left endpoint, and may include or may not include a right endpoint, which is not limited) | Phase extension range {θ3, θ4} | Phase range (which may include or may not include a left endpoint, and may include or may not include a right endpoint, which is not limited) |
| eMBB UE | {0.5, 0.2} | 0.5 to 1.2 | {15°, 10°} | 30° to 55° (first constellation point), 120° to 145° (second constellation point), 210° to 235° (third constellation point), and 300° to 325° (fourth constellation point) |
| URLLC UE | {0.75, 0.25} | 0.25 to 1.25 | {5°, 10°} | 40° to 55° (first constellation point), 130° to 145° (second constellation point), 220° to 235° (third constellation point), and 310° to 325° (fourth constellation point) |
| CPE UE | {0.75, 0.5} | 0.25 to 1.5 | {30°, 30°} | 15° to 75° (first constellation point), 105° to 165° (second constellation point), 195° to 255° (third constellation point), and 285° to 345° (fourth constellation point) |
| IoT UE | {0.5, 0.75} | 0.5 to 1.75 | {0, 5°} | 45° to 50° (first constellation point), 135° to 140° (second constellation point), 225° to 230° (third constellation point), and 315° to 320° (fourth constellation point) |

Optionally, an extension manner corresponding to each UE type may be configured. The extension manner may be one of the following two or three extension manners: amplitude and phase extension, amplitude extension (that is, a phase extension range is 0°), and phase extension (that is, an amplitude extension range is 0°). The configuration may be specified in a protocol, or indicated by the base station to the UE by using signaling, or indicated by a core network to the UE by using signaling. This is not limited. The configuration may be considered as a correspondence between a UE type and an extension manner. Optionally, there is a correspondence between a type of a terminal and an extension manner. The base station and/or the UE may determine an extension manner of the UE according to the correspondence.

Extension manners corresponding to different UE types may be the same or may be different. Table 7 and Table 8 each are an example of a correspondence between a UE type and an extension range. The correspondence between a type of a terminal and an extension manner may be at least one row and/or at least one column in the following table: Extension ranges for UE types in different extension manners may be configured by using a same list, table, or message, or may be configured by using different lists, tables, or messages. This is not limited.

TABLE 7

| UE type | Extension manner |
|---|---|
| Type 1 | Extension manner 1 |
| Type 2 | Extension manner 2 |
| Type 3 | Extension manner 3 |
| . . . | . . . |
| Type X | Extension manner X |

The type 1 to the type X each may be one of the types mentioned above, for example, eMBB UE, URLLC UE, IoT UE, CPE UE, V2X UE, AR UE, or VR UE. The extension manner 1 to the extension manner X each may be one of the manners mentioned above, for example, amplitude and phase extension, amplitude extension, or phase extension.

TABLE 8

| UE type | Extension manner |
|---|---|
| eMBB UE | Amplitude and phase extension |
| URLLC UE | Phase extension |
| CPE UE | Amplitude and phase extension |
| IoT UE | Amplitude extension |

In the foregoing manner, the modulation constellation diagram is determined based on a value range (for example, an amplitude range and/or a phase range). Compared with a conventional modulation constellation diagram, there may be larger space available for flexible constellation point mapping. In other words, a constellation point in a constellation diagram can be determined based on an actual transmission sequence, so that a PAPR can be reduced, a BER can be reduced, and transmission performance can be improved. In addition, considering requirements of different terminal types, a modulation constellation diagram may be determined based on a terminal type to meet requirements of different terminals, reduce PAPR and power consumption requirements of the terminals, and improve communication performance. In addition, determining a value range based on the reference constellation diagram can reduce indication overheads, reduce complexity of determining a modulation constellation diagram, and improve communication performance.

Information about the second-type modulation constellation diagram A: The modulation constellation diagram A includes M constellation points, M is a positive integer, and the information about the modulation constellation diagram A includes offsets of M1 constellation points in the M constellation points relative to M1 constellation points in a reference modulation constellation diagram. M1 is an integer greater than or equal to 1 and less than or equal to M.

For description of the reference modulation constellation diagram, refer to the foregoing description. Details are not described herein again.

The M constellation points in the modulation constellation diagram A respectively one-to-one correspond to M constellation points in the reference constellation diagram. For each constellation point in M2 constellation points in the modulation constellation diagram A, a value of the constellation point is a value of a constellation point that corresponds to the constellation point and that is in the reference constellation diagram. The M2 constellation points are constellation points other than the M1 constellation points in the modulation constellation diagram A. M2 is an integer greater than or equal to 0 and less than or equal to M. For each of the M1 constellation points in the modulation constellation diagram A, information about the constellation point includes an offset of a value of the constellation point relative to a value of a constellation point that corresponds to the constellation point and that is in the reference constellation diagram. The offset includes a real offset and/or an imaginary offset.

For example, for an $i^{th}$ constellation point in the reference constellation diagram, a value of the constellation point is ai+bi*j, that is, coordinates of the constellation point are (ai, bi), where i is a positive integer, ai and bi are real numbers, j is an imaginary unit, and a square of j is equal to −1. Coordinates of a constellation point that corresponds to the constellation point and that is in the modulation constellation diagram A are (ai+Δai, bi), (ai, bi+Δbi), or (ai+Δai, bi+Δbi). Herein, Dai is a real number, and represents a real offset. Δbi is a real number, and represents an imaginary offset.

A 2-order modulation constellation diagram is used as an example. FIG. 5(*a*) shows a reference constellation diagram. The reference constellation diagram is a QPSK constellation diagram. Complex values of four constellation points in the QPSK constellation diagram are respectively $$\frac{\sqrt{2}}{2}+\frac{\sqrt{2}}{2}j,\ \frac{-\sqrt{2}}{2}+\frac{\sqrt{2}}{2}j,\ \frac{-\sqrt{2}}{2}+\frac{-\sqrt{2}}{2}j,\text{ and }\frac{\sqrt{2}}{2}+\frac{-\sqrt{2}}{2}j,$$

and coordinates of four constellation points in the modulation constellation diagram A may be respectively represented as $$\left(\frac{\sqrt{2}}{2}+\Delta a1\right)+\left(\frac{\sqrt{2}}{2}+\Delta b1\right)j,\ \left(\frac{-\sqrt{2}}{2}+\Delta a2\right)+\left(\frac{\sqrt{2}}{2}+\Delta b2\right)j,$$
$$\left(\frac{-\sqrt{2}}{2}+\Delta a3\right)+\left(\frac{-\sqrt{2}}{2}+\Delta b3\right)j,\text{ and }\left(\frac{\sqrt{2}}{2}+\Delta a4\right)+\left(\frac{-\sqrt{2}}{2}+\Delta b4\right)j.$$

FIG. 5(*b*), FIG. 5(*c*), and FIG. 5(*d*) are three possible schematic diagrams of the modulation constellation diagram A.

Optionally, a plurality of offsets may be configured for a same UE type. The configuration may be specified in a protocol, or indicated by the base station to the UE by using signaling, or indicated by a core network to the UE by using signaling. This is not limited. For example, for the first UE type in the method shown in FIG. 2, two offsets may be configured, for example, a first-type offset shown in FIG. 5(*b*) and a second-type offset shown in FIG. 5(*c*). Two constellation diagrams corresponding to the two offsets may be included in N1 modulation constellation diagrams corresponding to the first UE type.

Optionally, for various UE types, an offset corresponding to each UE type may be configured. The configuration may be specified in a protocol, or indicated by the base station to the UE by using signaling, or indicated by a core network to the UE by using signaling. This is not limited. The configuration may be considered as a correspondence between a UE type and an offset. Optionally, there is a correspondence between a UE type and an offset. The base station and/or the UE may determine an offset of the UE according to the correspondence. Determining an offset of a constellation diagram based on a UE type can restrict behavior of the transmit end, and enable the receive end to have priori knowledge, so that demodulation performance is improved.

Offsets corresponding to different UE types may be the same, or may be different. Table 9 and Table 10 each are an example of a correspondence between a UE type and an offset. In this embodiment of this application, the correspondence between a UE type and an offset may include at least one row and/or at least one column in the following table:

TABLE 9

| UE type | Offset |
|---|---|
| Type 1 | First-type offset |
| Type 2 | Second-type offset |
| Type 3 | Third-type offset |
| . . . | . . . |
| Type X | $X^{th}$-type offset |

TABLE 10

Figure 5A:
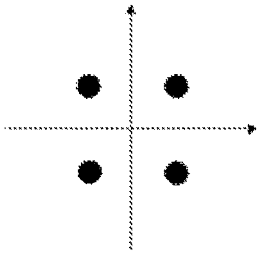
Figure 5B:
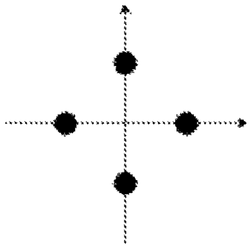
Figure 5C:
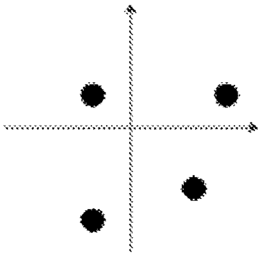
Figure 5D:
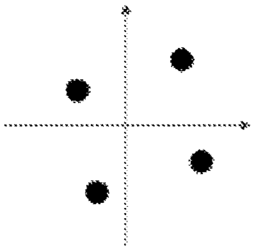

| UE type | Offset |
|---|---|
| eMBB UE | QPSK constellation diagram (that is, no offset) |
| URLLC UE | Offset shown in FIG. 5(b) |
| CPE UE | Offset shown in FIG. 5(c) |
| IoT UE | Offset shown in FIG. 5(d) |

In the foregoing manner, a coordinate offset of coordinates of a constellation point in the reference constellation diagram is configured to reduce configuration overheads and/or configuration complexity. In addition, in this manner, different constellation points in the constellation diagram may have different offsets, that is, some constellation points in the constellation diagram change, so that complexity of determining a constellation diagram can be reduced, and communication performance can be improved.

Information about the third-type modulation constellation diagram A: is a rotation phase of the modulation constellation diagram A relative to a reference modulation constellation diagram.

For description of the reference modulation constellation diagram, refer to the foregoing description. Details are not described herein again.

The M constellation points in the modulation constellation diagram A respectively one-to-one correspond to M constellation points in the reference constellation diagram. For each constellation point in the modulation constellation diagram A, a coordinate point (for example, (0, 0)) on a coordinate axis is used as a center, and information about the constellation point includes: a rotation phase of the constellation point relative to a constellation point that corresponds to the constellation point and that is in the reference constellation diagram. The rotation phase is a value greater than or equal to 0° and less than or equal to 360°, or the rotation phase is a value greater than or equal to 0° and less than or equal to 180°, or the rotation phase is a value greater than or equal to −90° and less than or equal to 90°, or the rotation phase is a value greater than or equal to −180° and less than or equal to 180°, for example, may be 0°, 15°, 30°, 45°, 60°, or another value. Rotation phases of different constellation points may be the same or may be different. This is not limited. When all constellation points have a same rotation phase, the rotation phase may be considered as a rotation phase of the modulation constellation diagram A relative to the reference modulation constellation diagram. Optionally, a rotation phase of at least one constellation point in the modulation constellation diagram A is 0°, and a rotation phase of another constellation point is not equal to 0°. For example, rotation phases of M1 constellation points in the modulation constellation diagram A are not equal to 0°.

Optionally, that a rotation manner corresponding to the rotation phase is clockwise or anticlockwise may be specified in a protocol or configured by the base station for the UE by using signaling. Rotation manners of different constellation points may be the same or may be different. This is not limited. When all constellation points have a same rotation manner, the rotation manner may be considered as a rotation manner of the modulation constellation diagram A relative to the reference modulation constellation diagram.

A 2-order modulation constellation diagram is used as an example. FIG. 6(*a*) shows a reference constellation diagram. The reference constellation diagram is a QPSK constellation diagram. FIG. 6(*b*), FIG. 6(*c*), and FIG. 6(*d*) are three possible schematic diagrams of the modulation constellation diagram A. Using a coordinate point (0, 0) as a center, the constellation diagram in FIG. 6(*b*) is rotated anticlockwise by 30° or rotated clockwise by 60° relative to the QPSK constellation diagram, the constellation diagram in FIG. 6(*c*) is rotated anticlockwise by 45° or rotated clockwise by 45° relative to the QPSK constellation diagram, and the constellation diagram in FIG. 6(*d*) is rotated anticlockwise by 60° or rotated clockwise by 30° relative to the QPSK constellation diagram.

Optionally, for a same UE type, a plurality of rotation phases and/or rotation manners may be configured. The configuration may be specified in a protocol, or indicated by the base station to the UE by using signaling, or indicated by a core network to the UE by using signaling. This is not limited. For example, for the first UE type in the method shown in FIG. 2, two types of rotation phases may be configured, for example, a first-type rotation phase shown in FIG. 6(*b*) and a second-type rotation phase shown in FIG. 6(*c*). Two constellation diagrams corresponding to the two types of rotation phases may be included in N1 modulation constellation diagrams corresponding to the first UE type.

Optionally, for various UE types, a rotation phase and/or a rotation manner corresponding to each UE type may be configured. The configuration may be specified in a protocol, or indicated by the base station to the UE by using signaling, or indicated by a core network to the UE by using signaling. This is not limited. The configuration may be considered as a correspondence between a UE type and a rotation phase and/or a rotation manner. Optionally, there is a correspondence between a UE type and a rotation phase and/or a rotation manner. The base station and/or the UE may determine a rotation phase and/or a rotation manner of the UE according to the correspondence. Determining an offset of a constellation diagram based on a UE type can restrict behavior of the transmit end, and enable the receive end to have priori knowledge, so that demodulation performance is improved.

Rotation phases and/or rotation manners corresponding to different UE types may be the same or may be different. Table 11 and Table 12 each show an example of a correspondence between a UE type and a rotation phase and/or a rotation manner. In this embodiment of this application, the correspondence between a UE type and a rotation phase and/or a rotation manner may include at least one row and/or at least one column in the following table:

TABLE 11

| UE type | Rotation phase | Rotation manner (optional) |
|---|---|---|
| Type 1 | First-type phase | Clockwise or anticlockwise |
| Type 2 | Second-type phase | Clockwise or anticlockwise |
| Type 3 | Third-type phase | Clockwise or anticlockwise |

TABLE 12

Figure 6A:
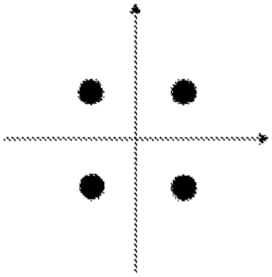
Figure 6B:
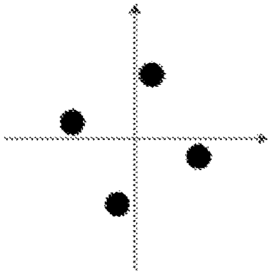
Figure 6C:
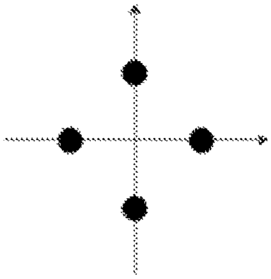
Figure 6D:
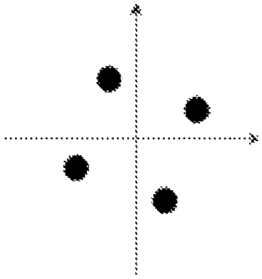

| UE type | Rotation phase | Rotation manner (optional) |
|---|---|---|
| eMBB UE | QPSK constellation diagram (that is, no rotation) | Clockwise or anticlockwise |
| URLLC UE | Rotation phase shown in FIG. 6(b) | Clockwise or anticlockwise |
| CPE UE | Rotation phase shown in FIG. 6(c) | Clockwise or anticlockwise |
| IoT UE | Rotation phase shown in FIG. 6(d) | Clockwise or anticlockwise |

In the foregoing manner, configuration overheads can be reduced and/or a design can be simplified by configuring a rotation phase of a constellation point in the reference constellation diagram. In addition, in this manner, different constellation points in the constellation diagram may have different rotation phases, that is, some constellation points in the constellation diagram change, so that complexity of determining a constellation diagram can be reduced, and communication performance can be improved.

Figure 7A:
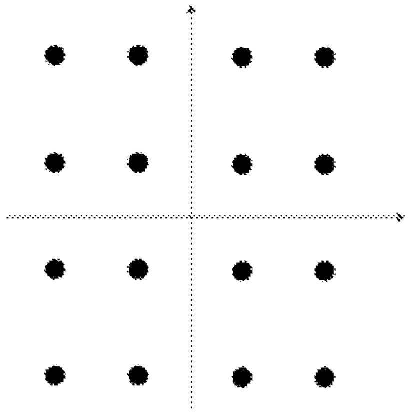
Figure 7B:
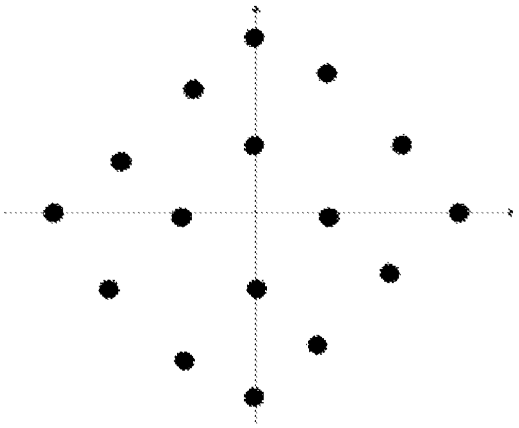

For ease of description, an example in which the reference constellation diagram of the modulation constellation diagram A is a QPSK modulation constellation diagram is used in the foregoing method examples. However, as described above, the reference modulation constellation diagram may alternatively be another modulation constellation diagram, such as a BPSK constellation diagram, a π/2-BPSK modulation constellation diagram, an 8PSK constellation diagram, an 8QAM constellation diagram, a 16QAM constellation diagram, or a 64QAM constellation diagram. For example, FIG. 7(*a*) shows a 16QAM modulation constellation diagram, and FIG. 7(*b*) shows a modulation constellation diagram A whose rotation phase is 450 relative to the 16QAM modulation constellation diagram.

Optionally, in the foregoing method, for a constellation point in the modulation constellation diagram A, bit information corresponding to the constellation point is the same as or different from bit information corresponding to a constellation point that is corresponding to the constellation point and that is in the reference constellation diagram. This is not limited. After the receive end receives a modulation symbol, the receive end determines, based on the received modulation symbol, that the transmit end sends a modulation symbol B. If the modulation symbol B is a constellation point in the modulation constellation diagram A, or if the modulation symbol B is a point in an area range (line segment or pattern) of a constellation point in the modulation constellation diagram A, the receive end may obtain bit information corresponding to the constellation point through demodulation.

Figure 8:
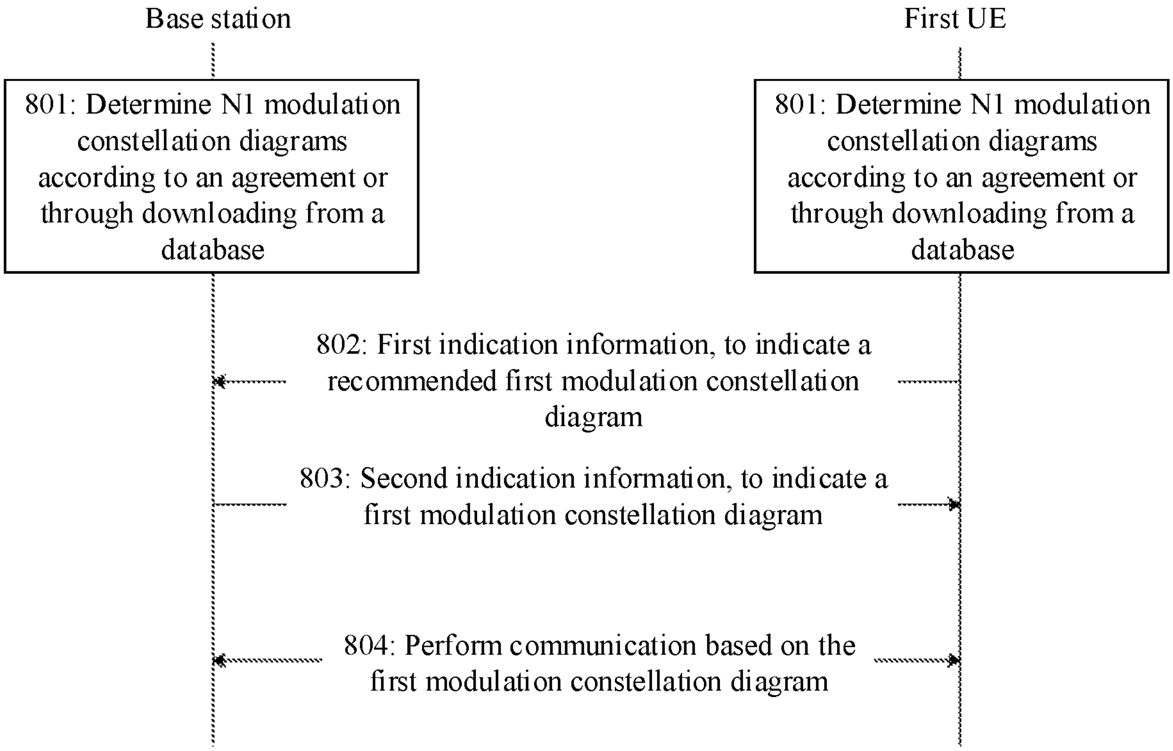
FIG. 8 to FIG. 10 each are a schematic flowchart of a data transmission method according to an embodiment of this application.
Figure 9:
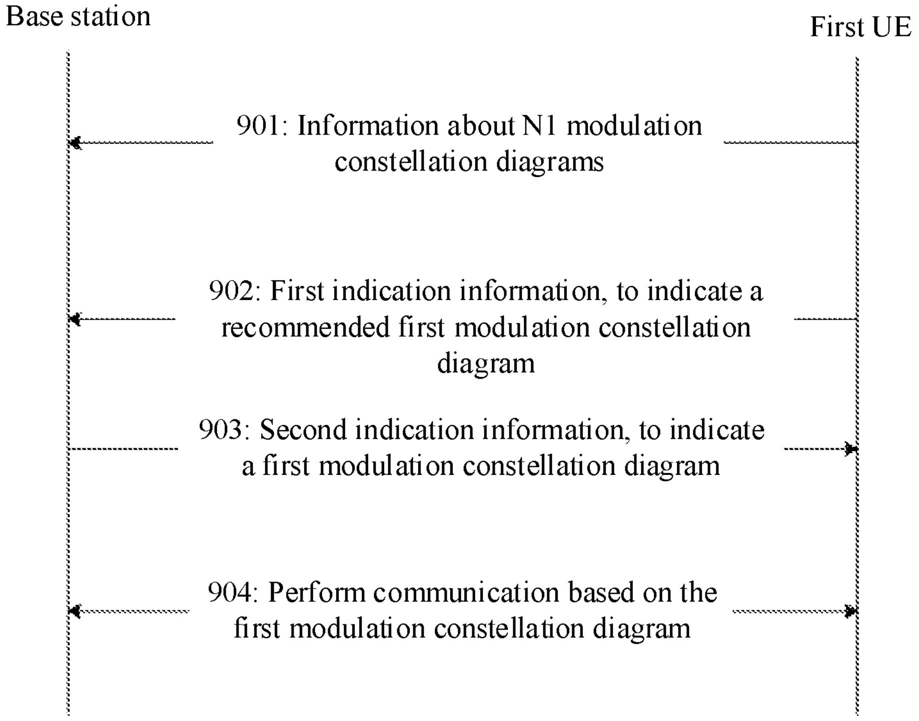
Figure 10:
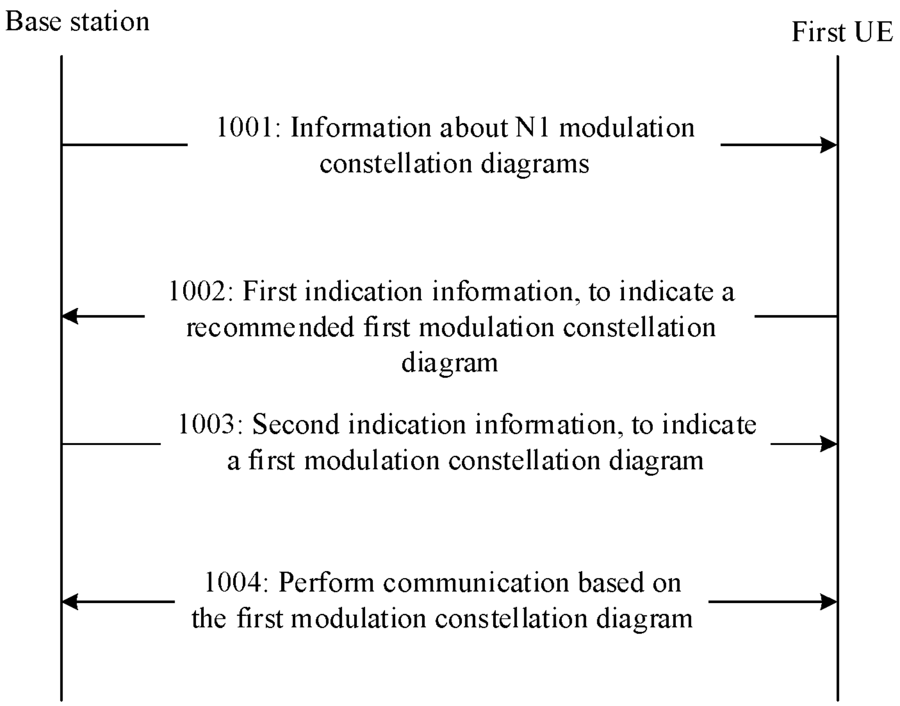

With reference to FIG. 8 to FIG. 10, the following describes a specific example procedure in which a base station and first UE communicate with each other by using the foregoing method. A procedure in which the base station and other UE, for example, second UE, communicate with each other by using the foregoing method is similar, and details are not described.

FIG. 8 shows a first specific example procedure in which a base station and first UE communicate with each other by using an irregular modulation constellation diagram.

Operation 801: The base station and the first UE each obtain information about N1 modulation constellation diagrams according to an agreement in a protocol or through downloading from a database.

The N1 modulation constellation diagrams may be described as a candidate modulation constellation diagram set or N1 candidate modulation constellation diagrams of the first UE.

Optionally, a same candidate modulation constellation diagram set may be configured for different UE types. Alternatively, as described above, respective corresponding candidate modulation constellation diagram sets may be configured for different UE types. For example, the N1 modulation constellation diagrams are a candidate modulation constellation diagram set of a first UE type, and a type of the first UE is the first UE type. N2 modulation constellation diagrams are a candidate modulation constellation diagram set of a second UE type, and a type of second UE is the second UE type. Optionally, N3 modulation constellation diagrams may be specified in a protocol, or N3 modulation constellation diagrams may be stored in a database, and the N3 modulation constellation diagrams include the N1 modulation constellation diagrams and the N2 modulation constellation diagrams.

In this embodiment of this application, the first UE type and the second UE type are used as examples. It may be understood that in practice, there may be a third UE type, a fourth UE type, or more UE types. This is not limited. In the method shown in FIG. 8, UE of each type may obtain, according to an agreement in a protocol or through downloading from a database, information about a candidate modulation constellation diagram set corresponding to a UE type of the UE.

Different candidate modulation constellation diagram sets may include a same quantity of modulation constellation diagrams, or may include different quantities of modulation constellation diagrams. This is not limited. When a candidate modulation constellation diagram set is configured for each UE type, candidate modulation constellation diagram sets for any two different UE types may be the same or different.

One candidate modulation constellation diagram set includes one or more irregular modulation constellation diagrams. Optionally, one or more regular modulation constellation diagrams may be further included. As described above, in this embodiment of this application, the regular modulation constellation diagram may be a BPSK constellation diagram, a π/2-BPSK constellation diagram, a QPSK modulation constellation diagram, a 16QAM constellation diagram, a 64QAM constellation diagram, a 256QAM constellation diagram, a 1024QAM constellation diagram, or the like.

Information about the candidate modulation constellation diagram set includes information about each modulation constellation diagram in the candidate modulation constellation diagram set.

For a modulation constellation diagram in the candidate modulation constellation diagram set, if the modulation constellation diagram is an irregular modulation constellation diagram, as described above, information about the modulation constellation diagram is used to indicate a value range of M1 constellation points in the modulation constellation diagram (for example, indicate at least one of the following information of each constellation point: information about a corresponding constellation point in the reference modulation constellation diagram, an extension manner, Z1, Z2, Z3, Z4, R1, R2, θ1, θ2, θ3, and θ4), offsets of M1 constellation points in the modulation constellation diagram relative to M1 constellation points in the reference modulation constellation diagram (for example, indicate at least one of the following information of each constellation point: information about a corresponding constellation point in the reference modulation constellation diagram, Δai, and Δbi), or a rotation phase of the modulation constellation diagram relative to the reference modulation constellation diagram (for example, indicate at least one of the following information of each constellation point: information about a corresponding constellation point in the reference modulation constellation diagram, a rotation manner, and a rotation angle). Optionally, the information about the modulation constellation diagram is further used to indicate one or more of the following: a type of the modulation constellation diagram, an order of the modulation constellation diagram, information about a reference modulation constellation diagram of the modulation constellation diagram, and an index of the modulation constellation diagram. For details, refer to the foregoing description. Details are not described again. The type of the modulation constellation diagram is used to indicate whether the modulation constellation diagram is a regular modulation constellation diagram or an irregular modulation constellation diagram.

For a modulation constellation diagram in the candidate modulation constellation diagram set, if the modulation constellation diagram is a regular modulation constellation diagram, information about the modulation constellation diagram is used to indicate one or more of the following: a type of the modulation constellation diagram, an order of the modulation constellation diagram, and an index of the modulation constellation diagram. One candidate modulation constellation diagram set may include modulation constellation diagrams with one or more orders, and one or more modulation constellation diagrams may be included for each order.

Optionally, in operation 802, the first UE sends first indication information to the base station, to indicate one or more modulation constellation diagrams B.

The one or more modulation constellation diagrams B indicated by the first indication information may be described as modulation constellation diagrams recommended by the first UE to the base station. In this operation, the UE can send modulation constellation diagram recommendation information or modulation constellation diagram request information, that is, the first indication information is used to indicate a constellation diagram that the UE expects to use or a constellation diagram recommended by the UE.

For example, when the UE has a capability of training or determining a constellation diagram, the UE may determine a modulation constellation diagram based on a service type or a channel environment, and notify the base station of the modulation constellation diagram that the UE expects to use. In this case, the UE can determine and/or update the modulation constellation diagram in real time, to better meet a communication requirement of the UE and improve communication performance.

Optionally, when the first indication information indicates one modulation constellation diagram B, the base station and the first UE may use the recommended modulation constellation diagram B as a first modulation constellation diagram by default, that is, the method does not include operation 803; or the base station further configures a first modulation constellation diagram for the first UE by using operation 803. If the base station further configures the first modulation constellation diagram for the first UE by using 803, that is, when the method shown in FIG. 8 includes both operation 802 and operation 803, the first modulation constellation diagram configured by the base station by using operation 803 may be included in the one or more modulation constellation diagrams B indicated by the first indication information, or may not be included in the one or more modulation constellation diagrams B. This is not limited.

The first indication information indicates the one or more modulation constellation diagrams B from N1 candidate modulation constellation diagrams of the first UE. The N1 candidate modulation constellation diagrams include modulation constellation diagrams with one or more orders, and one or more modulation constellation diagrams may be included for each order.

In a possible implementation, the first indication information indicates indices of the one or more modulation constellation diagrams B in the N1 candidate modulation constellation diagrams.

In this method, the N1 candidate modulation constellation diagrams are jointly numbered, and each candidate modulation constellation diagram is corresponding to one unique index. An index of each candidate modulation constellation diagram may be included in information about the modulation constellation diagram. Indices of the N1 candidate modulation constellation diagrams are respectively 0 to N1−1 or 1 to N1. Table 13 shows an example of joint numbering. In this embodiment of this application, a correspondence between an index and a modulation constellation diagram may include at least one row in Table 13.

For example, the first indication information indicates an index of one modulation constellation diagram B by using $\lceil \log_2 N1 \rceil$ bits. If the first indication information indicates an index 3, the modulation constellation diagram B indicated by the first indication information is a modulation constellation diagram 4.

For another example, the first indication information indicates one or more modulation constellation diagrams B by using an N1-bit bitmap (or referred to as a bitmap). Each bit in the bitmap uniquely corresponds to one of the N1 modulation constellation diagrams. When a value of the bit is t1, the one or more modulation constellation diagrams B include the modulation constellation diagram corresponding to the bit. When a value of the bit is t2 or is not t1, the one or more modulation constellation diagrams B do not include the modulation constellation diagram corresponding to the bit. Herein, t1 and t2 are integers. For example, t1 is 1, and t2 is 0, or t1 is 0, and t2 is 1.

TABLE 13

| Candidate modulation constellation diagram | Modulation order | Index |
|---|---|---|
| Modulation constellation diagram 1 | 2 | 0 |
| Modulation constellation diagram 2 | 2 | 1 |
| Modulation constellation diagram 3 | 4 | 2 |
| Modulation constellation diagram 4 | 4 | 3 |
| Modulation constellation diagram 5 | 6 | 4 |
| Modulation constellation diagram 6 | 6 | 5 |
| Modulation constellation diagram 7 | 6 | 6 |
| Modulation constellation diagram 8 | 8 | 7 |
| Modulation constellation diagram 9 | 8 | 8 |
| Modulation constellation diagram 10 | 8 | 9 |
| Modulation constellation diagram 11 | 8 | 10 |

In a possible implementation, the first indication information indicates an order of the modulation constellation diagram B and/or an index of the modulation constellation diagram B in a candidate modulation constellation diagram set of the order.

In this method, modulation constellation diagrams of a same order in the N1 candidate modulation constellation diagrams are jointly numbered, and each candidate modulation constellation diagram corresponds to one order and a unique index in the order. An index of each candidate modulation constellation diagram may be included in information about the modulation constellation diagram. An order of each candidate modulation constellation diagram may be included in information about the modulation constellation diagram, or may be obtained through inference based on information about the modulation constellation diagram, for example, obtained through inference based on a quantity of constellation points in the modulation constellation diagram. For one order, if the N1 candidate modulation constellation diagrams include N4 modulation constellation diagrams, indices of the N4 modulation constellation diagrams are respectively 0 to N4−1 or 1 to N4. Table 14 shows an example of joint numbering in a same order. In this embodiment of this application, a joint numbering design in a same order may include at least one row shown in Table 14. For example, if the first indication information indicates that a modulation order is 6 and an index is 2, the modulation constellation diagram B indicated by the first indication information is a modulation constellation diagram 7.

Optionally, an order of the modulation constellation diagram B is specified in a protocol, and the first indication information indicates an index of the modulation constellation diagram B in a candidate modulation constellation diagram set of the order.

Optionally, the first indication information indicates an order of the modulation constellation diagram B, and an index of the modulation constellation diagram B in a candidate modulation constellation diagram set of the order is specified in a protocol.

Optionally, the first indication information indicates an order of the modulation constellation diagram B and an index of the modulation constellation diagram B in a candidate modulation constellation diagram set of the order. Optionally, for an order of the modulation constellation diagram B, when the N1 candidate modulation constellation diagrams include only one candidate modulation constellation diagram of the order, the first indication information does not need to indicate an index of the modulation constellation diagram B in a candidate modulation constellation diagram set of the order. The first indication information indicates the order of the modulation constellation diagram B. After receiving the first indication information, the base station uses one candidate modulation constellation diagram corresponding to the order as the modulation constellation diagram B.

TABLE 14

| Candidate modulation constellation diagram | Modulation order | Index |
|---|---|---|
| Modulation constellation diagram 1 | 2 | 0 |
| Modulation constellation diagram 2 | 2 | 1 |
| Modulation constellation diagram 3 | 4 | 0 |
| Modulation constellation diagram 4 | 4 | 1 |
| Modulation constellation diagram 5 | 6 | 0 |
| Modulation constellation diagram 6 | 6 | 1 |
| Modulation constellation diagram 7 | 6 | 2 |
| Modulation constellation diagram 8 | 8 | 0 |
| Modulation constellation diagram 9 | 8 | 1 |
| Modulation constellation diagram 10 | 8 | 2 |
| Modulation constellation diagram 11 | 8 | 3 |

In a possible implementation, the first modulation constellation diagram is indicated by using an uplink reference signal, and there is a correspondence between an uplink reference signal and a modulation constellation diagram (or an index and/or an order of a modulation constellation diagram). The uplink reference signal may be a demodulation reference signal (DMRS) of a PUSCH or a sounding reference signal (SRS). In this case, the uplink reference signal may be considered as the first indication information.

The correspondence between an uplink reference signal and a modulation constellation diagram (or an index and/or an order of a modulation constellation diagram) may be predefined in a protocol, or may be notified by the base station to the UE by using signaling, or may be notified by a core network to the UE by using signaling. For example, a modulation constellation diagram index 1 corresponds to a reference signal sequence 1, a modulation constellation diagram index 2 corresponds to a reference signal sequence 2, and by analogy, a modulation constellation diagram index v corresponds to a reference signal sequence v. Optionally, in operation 803, the base station sends second indication information to the first UE, to indicate the first modulation constellation diagram.

The method may include both operation 802 and operation 803, or include operation 803 but not include operation 802. Optionally, when N1 is equal to 1, neither operation 802 nor operation 803 needs to be included.

The second indication information indicates the first modulation constellation diagram from the N1 candidate modulation constellation diagrams of the first UE. A specific indication method is similar to the method in which the first indication information indicates one modulation constellation diagram B from the N1 candidate modulation constellation diagrams of the first UE, and details are not described herein again. When the uplink reference signal is the first indication information, the uplink reference signal needs to be replaced with a downlink reference signal. In other words, there is a correspondence between a downlink reference signal and a modulation constellation diagram (or an index and/or an order of a modulation constellation diagram). The downlink reference signal may be a DMRS of a PDSCH or a channel state information reference signal (CSI-RS).

Optionally, when the second indication information indicates an index of the first modulation constellation diagram in the N1 candidate modulation constellation diagrams, the second indication information is included in a MIB, a SIB, RRC signaling, a MAC CE, or DCI.

Optionally, when the second indication information indicates an order of the first modulation constellation diagram and an index of the first modulation constellation diagram in a candidate modulation constellation diagram set of the order, the second indication information may be included in a message. For example, the second indication information is included in a MIB, a SIB, RRC signaling, a MAC CE, or DCI.

For example, the second indication information is modulation and coding scheme (MCS) information in the DCI. The MCS information is used to indicate the order of the first modulation constellation diagram and the index of the first modulation constellation diagram in the candidate modulation constellation diagram set of the order. For example, one piece of MCS information indicates one identifier, and one identifier corresponds to one order and one modulation constellation diagram index. A correspondence between an identifier and both an order and an index of a modulation constellation diagram may be specified in a protocol, or may be notified by the base station to the first UE by using signaling. This is not limited.

Optionally, the MCS information in this embodiment of this application may be modulation and coding scheme and constellation (MCS-C) information, or may have another name. This is not limited in this application.

For example, Table 15-1 shows an identifier indicated by MCS information, an order of a first modulation constellation diagram corresponding to each identifier, and an index of the first modulation constellation diagram in a candidate modulation constellation diagram set of the order.

TABLE 15-1

| Identifier indicated by MCS information | Modulation order | Index |
|---|---|---|
| 0 | 2 | 0 |
| 1 | 2 | 1 |
| 2 | 2 | 2 |

TABLE 15-1-continued

| Identifier indicated by MCS information | Modulation order | Index |
|---|---|---|
| 3 | 2 | 3 |
| 4 | 4 | 0 |
| 5 | 4 | 1 |
| 6 | 4 | 2 |
| 7 | 4 | 3 |

For example, the second indication information is modulation and coding scheme (MCS) information in the DCI. The MCS information is used to indicate an index of the first modulation constellation diagram in a candidate modulation constellation diagram set. For example, one piece of MCS information indicates one identifier, and one identifier corresponds to one modulation constellation diagram index. A correspondence between an identifier and an index of a modulation constellation diagram may be specified in a protocol, or may be notified by the base station to the first UE by using signaling. This is not limited.

Optionally, the base station and/or the UE determine/determines a modulation constellation diagram and a modulation order based on an index.

For example, Table 15-2 shows an identifier that can be indicated by MCS information, and an index of a first modulation constellation diagram corresponding to each identifier in a candidate modulation constellation diagram set.

TABLE 15-2

| Identifier indicated by MCS information | Modulation constellation diagram index |
|---|---|
| 0 | 0 |
| 1 | 1 |
| 2 | 2 |
| 3 | 3 |
| 4 | 4 |
| 5 | 5 |
| 6 | 6 |
| 7 | 7 |

Optionally, a constellation diagram index, an order, and a bit rate may be jointly encoded. For example, the second indication information indicates a constellation diagram index, an order, and a bit rate.

For example, the MCS information may further indicate a bit rate used during data transmission. For example, the MCS information includes DCI for scheduling a PDSCH, and the MCS information indicates a bit rate used during PDSCH transmission. For another example, the MCS information includes DCI for scheduling a PUSCH, and the MCS information indicates a bit rate used during PUSCH transmission. For example, one piece of MCS information indicates one identifier, and one identifier corresponds to one order, one modulation constellation diagram index, and one bit rate. A correspondence between an identifier and all of an order, an index of a modulation constellation diagram, and a bit rate may be specified in a protocol, or may be notified by the base station to the first UE by using signaling. This is not limited.

For example, Table 16-1 shows an identifier that can be indicated by MCS information, an order of a first modulation constellation diagram corresponding to each identifier, an index of the first modulation constellation diagram in a candidate modulation constellation diagram set of the order, and a bit rate used during data transmission. For example, when an identifier indicated by the MCS information is 0, it indicates that a modulation order is 2, the first modulation constellation diagram is a modulation constellation diagram whose index is 0 in 2-order modulation constellation diagrams, a bit rate is 120/1024≈0.1172, spectral efficiency is $$\left(\frac{120}{1024}\right) * 2 \text{ (order)} \approx 0.2344,$$

and so on.

TABLE 16-1

| Identifier indicated by MCS information | Modulation order | Index | Bit rate (*1024) |
|---|---|---|---|
| 0 | 2 | 0 | 120 |
| 1 | 2 | 0 | 157 |
| 2 | 2 | 1 | 120 |
| 3 | 2 | 1 | 157 |
| 4 | 4 | 0 | 340 |
| 5 | 4 | 0 | 378 |
| 6 | 4 | 1 | 340 |
| 7 | 4 | 1 | 378 |

Optionally, a constellation diagram index and a bit rate may be jointly encoded. For example, the second indication information indicates a constellation diagram index and a bit rate.

For example, the MCS information may further indicate a bit rate used during data transmission. For example, the MCS information includes DCI for scheduling a PDSCH, and the MCS information indicates a bit rate used during PDSCH transmission. For another example, the MCS information includes DCI for scheduling a PUSCH, and the MCS information indicates a bit rate used during PUSCH transmission. For example, one piece of MCS information indicates one identifier, and one identifier corresponds to one modulation constellation diagram index and one bit rate. A correspondence between an identifier and both an index of a modulation constellation diagram and a bit rate may be specified in a protocol, or may be notified by the base station to the first UE by using signaling. This is not limited.

For example, Table 16-2 shows an identifier that can be indicated by MCS information, an index of a first modulation constellation diagram corresponding to each identifier in a candidate modulation constellation diagram set of the order, and a bit rate used during data transmission. For example, when an identifier indicated by the MCS information is 0, it indicates that the first modulation constellation diagram is a modulation constellation diagram whose index is 0, a bit rate is 120/1024≈0.1172, and so on.

TABLE 16-2

| Identifier indicated by MCS information | Index | Bit rate (*1024) |
|---|---|---|
| 0 | 0 | 120 |
| 1 | 0 | 157 |
| 2 | 1 | 120 |
| 3 | 1 | 157 |
| 4 | 2 | 340 |
| 5 | 2 | 378 |
| 6 | 3 | 340 |
| 7 | 4 | 378 |

Optionally, when the second indication information indicates the order of the first modulation constellation diagram and the index of the first modulation constellation diagram in the candidate modulation constellation diagram set of the order, the second indication information may be included in two messages, where a message A indicates the order of the first modulation constellation diagram, and a message B indicates the index of the first modulation constellation diagram in the candidate modulation constellation diagram set of the order. For example, the message A is included in a MIB, a SIB, RRC signaling, a MAC CE, or DCI, and the message B is included in a MIB, a SIB, RRC signaling, a MAC CE, or DCI. The message A and the message B are included in messages of different types. For example, the message A is included in a SIB, RRC signaling, or a MAC CE, and the message B is included in DCI. Alternatively, the message A and the message B are included in different messages of a same type. For example, the message A is included in first RRC signaling, and the message B is included in second RRC signaling. Alternatively, for example, the message A is included in first DCI, and the message B is included in second DCI.

Operation 804: The base station and the first UE communicate with each other based on the first modulation constellation diagram.

Optionally, for the base station or the first UE, the communication includes sending a signal and/or receiving a signal.

The communication includes uplink transmission and/or downlink transmission. The uplink transmission (that is, sending by the first UE to the base station) includes but is not limited to transmitting a PRACH, a PUSCH, or a PUCCH. The downlink transmission (that is, sending by the base station to the first UE) includes but is not limited to transmitting a PBCH, a PDSCH, or a PDCCH.

The transmit end sequentially maps bit information in a to-be-sent bitstream to one or more modulation symbols by using the first modulation constellation diagram. After receiving the one or more modulation symbols, the receive end sequentially maps each modulation symbol into bit information by using the first modulation constellation diagram, and performs concatenation, to obtain a received bitstream through demodulation.

In operation 804, the base station and the first UE may communicate with each other one or more times based on the first modulation constellation diagram.

In the foregoing embodiment, the modulation constellation diagram is determined in a manner of predefining in a communication protocol or downloading from a database, so that signaling overheads can be reduced, and communication performance can be improved.

FIG. 9 shows a second specific example procedure in which a base station and first UE communicate with each other by using an irregular modulation constellation diagram.

Operation 901: The first UE sends information about N1 modulation constellation diagrams to the base station.

The N1 modulation constellation diagrams may be N1 candidate modulation constellation diagrams specific to the first UE, or may be N1 candidate modulation constellation diagrams specific to a first UE type. This is not limited. A type of the first UE is the first UE type.

For descriptions of the information about the N1 modulation constellation diagrams, refer to operation 801. Details are not described herein again.

The first UE sends information about each of the N1 modulation constellation diagrams to the base station.

For a modulation constellation diagram in a candidate modulation constellation diagram set, if the modulation constellation diagram is an irregular modulation constellation diagram, when a value range related to the modulation constellation diagram is indicated, a specific value of the value range may be indicated, or one value range is indicated in e1 candidate value ranges by using a positive integer quantity of bits, where e1 is an integer greater than 1. A specific value of the positive integer may be determined according to e1, for example, is equal to $\lceil \log_2 e1 \rceil$.

For different UE types, quantities of candidate value ranges may be the same or may be different. This is not limited. Optionally, there is a correspondence between a UE type and a quantity of bits of information indicating the modulation constellation diagram.

For a modulation constellation diagram in a candidate modulation constellation diagram set, if the modulation constellation diagram is an irregular modulation constellation diagram, when an offset related to the modulation constellation diagram is indicated, a specific value of the offset may be indicated, or one offset is indicated in e2 candidate offsets by using a positive integer quantity of bits, where e2 is an integer greater than 1. A specific value of the positive integer may be determined according to e2, for example, is equal to $\lceil \log_2 e2 \rceil$.

For different UE types, quantities of candidate offsets may be the same or may be different. This is not limited. Optionally, there is a correspondence between a UE type and a quantity of bits of information indicating the modulation constellation diagram.

For a modulation constellation diagram in a candidate modulation constellation diagram set, if the modulation constellation diagram is an irregular modulation constellation diagram, when sending a phase rotation angle related to the modulation constellation diagram to the base station, the first UE may indicate a specific value of the phase rotation angle, or indicate one angle in e3 candidate phase rotation angles by using a positive integer quantity of bits, where e3 is an integer greater than 1. A specific value of the positive integer may be determined according to e3, for example, is equal to $\lceil \log_2 e3 \rceil$.

For different UE types, quantities of candidate phase rotation angles may be the same or may be different. This is not limited. Optionally, there is a correspondence between a UE type and a quantity of bits of information indicating the modulation constellation diagram.

For example, for a low-cost and low-power-consumption terminal such as an IoT terminal, a quantity of bits of information about a modulation constellation diagram may be relatively small, so that bit overheads are reduced. In addition, a PAPR and a BER are jointly optimized, so that communication performance is ensured, processing complexity is reduced, and power consumption is reduced while the PAPR is reduced.

Before operation 901, optionally, the base station may allocate a resource to the first UE, where the resource is to be used by the terminal to send the information about the N1 modulation constellation diagrams.

For example, the first UE notifies the base station of the information about the N1 modulation constellation diagrams by using RRC signaling or a MAC CE.

Optionally, in operation 902, the first UE sends first indication information to the base station, to indicate a modulation constellation diagram B.

Optionally, in operation 903, the base station sends second indication information to the first UE, to indicate a first modulation constellation diagram.

Operation 904: The base station and the first UE communicate with each other based on the first modulation constellation diagram.

Operation 902 to operation 904 are the same as operation 802 to operation 804, and details are not described herein again.

When the base station communicates with the first UE based on the first modulation constellation diagram, optionally, operation 905 is included: The base station sends third indication information to the first UE, to indicate feedback information. Optionally, the feedback information is used to indicate communication performance, indicate whether the first modulation constellation diagram is appropriate, or indicate whether the first modulation constellation diagram meets a performance requirement.

For example, the feedback information is used to indicate uplink communication performance of communication based on the first modulation constellation diagram, or may be used to indicate downlink communication performance of communication based on the first modulation constellation diagram. For example, a BER, a PAPR, or an acknowledgement (ACK)/NACK in the communication is indicated.

For example, for downlink data transmission, the first UE notifies the base station that the modulation constellation diagram B is the first modulation constellation diagram (for example, a modulation constellation diagram 1), and the base station sends data to the first UE by using the first modulation constellation diagram. The base station may send data transmission performance to the first UE, for example, PAPR performance and/or BER performance during data transmission based on the modulation constellation diagram. For example, the base station may train a transmission procedure based on a channel characteristic collected for a long time, or obtain PAPR performance and/or BER performance during data transmission based on an algorithm. The first UE may update the constellation diagram based on the feedback information sent by the base station.

For example, the base station may send the PAPR performance or the BER performance in at least one of the following manners:

Manner 1: The base station sends, to the first UE, information indicating whether the PAPR or BER performance meets a requirement, and sends 1 if the PAPR or BER performance meets the requirement, or sends 0 if the PAPR or BER performance does not meet the requirement. A PAPR performance threshold or a BER performance threshold may be used to determine whether the requirement is met.

Manner 2: The base station sends PAPR performance or BER performance of communication within a period of time to the first UE. For example, the performance may be an average value, a maximum value, a minimum value, or the like.

For example, the PAPR performance threshold may be a probability that the PAPR is less than or equal to a threshold within a period of time, or a probability that the PAPR is greater than a threshold within a period of time.

For example, the BER performance threshold may be a probability that the BER is less than or equal to a threshold within a period of time, or a probability that the BER is greater than a threshold within a period of time.

For example, for uplink data transmission, the first UE notifies the base station that the modulation constellation diagram B is the first modulation constellation diagram (for example, a modulation constellation diagram 2), and the first UE sends data to the base station by using the first modulation constellation diagram. The base station may feed back data transmission performance, such as BER performance and/or HARQ-ACK performance, to the first UE. The first UE may update the constellation diagram based on the feedback information sent by the base station.

The HARQ-ACK performance may be determined in at least one of the following manners:

Manner 1: The HARQ-ACK performance is determined based on a quantity of times that the base station repeatedly schedules data. For example, the first UE may determine, based on a new data indicator in DCI, whether the transmission is new transmission or retransmission. Then, the first UE may determine a percentage of times of repeated scheduling within a period of time, and the like.

Manner 2: The base station sends HARQ-ACK information to the first UE. For example, if uplink data is successfully received, the base station sends an ACK; or if uplink data fails to be received, the base station sends a NACK. Then, the UE may determine a percentage of times of repeated scheduling within a period of time, and the like.

Manner 3: The base station sends, to the first UE, information indicating whether the HARQ-ACK performance meets a requirement, and sends 1 if the HARQ-ACK performance meets the requirement, or sends 0 if the HARQ-ACK performance does not meet the requirement. Whether the requirement is met may be determined based on a HARQ-ACK performance threshold. For example, the HARQ-ACK performance threshold may refer to a probability of successful data transmission within a period of time, or a probability of unsuccessful data transmission within a period of time.

Optionally, a feedback cycle of the third indication information may be determined based on a UE type. For example, there is a correspondence between a feedback cycle of the third indication information and a UE type. The base station and/or the UE determine/determines the feedback cycle of the third indication information based on the UE type.

For example, a feedback cycle of a UE type 1 is T1, a feedback cycle of a UE type 2 is T2, and a feedback cycle of a UE type X is TX.

In this manner, feedback cycles of different UE types are different, so that performance requirements of different terminals can be better met, capabilities of different terminals can be met, power consumption can be reduced, and communication performance can be improved.

Optionally, a performance threshold corresponding to the third indication information may be at least one of a PAPR performance threshold, a BER performance threshold, and a HARQ-ACK performance threshold.

Optionally, the performance threshold corresponding to the third indication information may be determined based on a UE type. For example, there is a correspondence between a performance threshold corresponding to the third indication information and a UE type. The base station and/or the UE determine/determines the performance threshold corresponding to the third indication information based on the UE type. This is similar to the description in operation 905, and is not described herein again.

For example, a PAPR performance threshold of a UE type 1 is p1, a PAPR performance threshold of a UE type 2 is p2, and a PAPR performance threshold of a UE type X is pX.

For example, a BER performance threshold of a UE type 1 is b1, a BER performance threshold of a UE type 2 is b2, and a BER performance threshold of a UE type X is bX.

For example, a HARQ-ACK performance threshold of a UE type 1 is h1, a HARQ-ACK performance threshold of a UE type 2 is h2, and a HARQ-ACK performance threshold of a UE type X is hX.

In this manner, feedback cycles and/or feedback thresholds of different UE types are different, so that performance requirements of different terminals can be better met, capabilities of different terminals can be met, power consumption can be reduced, and communication performance can be improved.

In this manner, when the first UE has a capability of training or determining a constellation diagram, the first UE may determine a modulation constellation diagram based on a type of the first UE or a channel environment, and notify the base station of a recommended modulation constellation diagram. In other words, the terminal can determine and/or update the modulation constellation diagram in real time, to better meet a communication requirement of the terminal and improve communication performance.

FIG. 10 shows a third specific example procedure in which a base station and first UE communicate with each other by using an irregular modulation constellation diagram.

Operation 1001: The base station sends information about N1 modulation constellation diagrams to the first UE.

The N1 modulation constellation diagrams may be N1 common candidate modulation constellation diagrams of various UE types, may be N1 candidate modulation constellation diagrams specific to the first UE, or may be N1 candidate modulation constellation diagrams specific to a first UE type. This is not limited. A type of the first UE is the first UE type.

Description of the information about the N1 modulation constellation diagrams and description of indicating the information about the N1 modulation constellation diagrams are similar to those in operation 901, and details are not described herein again.

For example, the base station notifies the first UE of the information about the N1 modulation constellation diagrams by using a MIB, a SIB, RRC signaling, a MAC CE, or DCI.

Optionally, in operation 1002, the first UE sends first indication information to the base station, to indicate a modulation constellation diagram B.

Optionally, in operation 1003, the base station sends second indication information to the first UE, to indicate a first modulation constellation diagram.

Operation 1004: The base station and the first UE communicate with each other based on the first modulation constellation diagram.

Operation 1002 to operation 1004 are the same as operation 802 to operation 804, and details are not described herein again.

When the base station communicates with the first UE based on the first modulation constellation diagram, optionally, operation 1005 is included: The first UE sends fourth indication information to the base station, to indicate feedback information. Optionally, the feedback information is used to indicate communication performance of the first modulation constellation diagram, indicate whether the first modulation constellation diagram is appropriate, or indicate whether the first modulation constellation diagram meets a performance requirement.

For example, the feedback information is used to indicate uplink communication performance of communication based on the first modulation constellation diagram, or may be used to indicate downlink communication performance of communication based on the first modulation constellation diagram. For example, a BER, a PAPR, or an acknowledgement (ACK)/NACK in the communication is indicated. Optionally, the first UE may add the feedback information to uplink control information.

For example, for downlink data transmission, the base station notifies the first UE of the first modulation constellation diagram (for example, a modulation constellation diagram 1), and the base station sends data to the first UE based on the notified first modulation constellation diagram. The first UE may feed back data transmission performance, for example, BER performance or HARQ-ACK performance, to the base station. The base station updates the constellation diagram based on the feedback information sent by the first UE.

The HARQ-ACK performance may be determined in at least one of the following manners:

Manner 1: The first UE sends HARQ-ACK information to the base station. For example, if downlink data is successfully received, the first UE sends an ACK; or if downlink data fails to be received, the first UE sends a NACK. Then, the base station may determine a percentage of times of repeated scheduling within a period of time, or the base station may determine a percentage of whether data transmission is correct within a period of time, or the like.

Manner 2: The first UE sends, to the base station, information indicating whether the HARQ-ACK performance meets a requirement, and sends 1 if the HARQ-ACK performance meets the requirement, or sends 0 if the HARQ-ACK performance does not meet the requirement. A HARQ-ACK performance threshold may be used to determine whether the requirement is met. For example, the HARQ-ACK performance threshold may refer to a probability of successful data transmission within a period of time, or a probability of unsuccessful data transmission within a period of time.

For uplink data transmission, the base station notifies the first UE of the first modulation constellation diagram (for example, a modulation constellation diagram 2), and the first UE sends data to the base station based on the notified first modulation constellation diagram. The first UE may feed back data transmission performance to the base station, for example, PAPR performance or BER performance during data transmission based on the first modulation constellation diagram. For example, the first UE may train a transmission procedure based on a channel characteristic collected for a long time, or obtain PAPR performance and BER performance during data transmission based on an algorithm.

For example, the first UE may feed back the PAPR performance or the BER performance in at least one of the following manners:

Manner 1: The first UE sends, to the base station, information indicating whether the PAPR or BER performance meets a requirement, and sends 1 if the PAPR or BER performance meets the requirement, or sends 0 if the PAPR or BER performance does not meet the requirement. A PAPR performance threshold or a BER performance threshold may be used to determine whether the requirement is met.

Manner 2: The first UE sends PAPR performance or BER performance of communication within a period of time to the base station. For example, the performance may be an average value, a maximum value, a minimum value, or the like.

For example, the PAPR performance threshold may be a probability that the PAPR is less than or equal to a threshold within a period of time, or a probability that the PAPR is greater than a threshold within a period of time.

For example, the BER performance threshold may be a probability that the BER is less than or equal to a threshold within a period of time, or a probability that the BER is greater than a threshold within a period of time.

Optionally, a feedback cycle of the fourth indication information may be determined based on a UE type. For example, there is a correspondence between a feedback cycle of the fourth indication information and a UE type. The base station and/or the UE determine/determines the feedback cycle of the fourth indication information based on the UE type. This is similar to the description in operation 905, and is not described herein again.

Optionally, a performance threshold corresponding to the fourth indication information may be at least one of a PAPR performance threshold, a BER performance threshold, and a HARQ-ACK performance threshold.

Optionally, the performance threshold corresponding to the fourth indication information may be determined based on a UE type. For example, there is a correspondence between a performance threshold corresponding to the fourth indication information and a UE type. The base station and/or the UE determine/determines the performance threshold based on the UE type. This is similar to the description in operation 905, and is not described herein again.

In this manner, when the base station has a capability of training or determining a constellation diagram, the base station may determine a modulation constellation diagram based on a type of the UE or a channel environment, and notify the terminal of a used modulation constellation diagram. In other words, the base station can determine and/or update the modulation constellation diagram in real time, to better meet a communication requirement of the terminal and improve communication performance.

In a possible implementation C1, the method provided in this embodiment of this application may further include: determining a modulation constellation diagram based on capability information of UE. For example, the UE, such as the first UE or the second UE, sends the capability information of the UE to the base station, to indicate whether the UE supports an irregular modulation constellation diagram. If the UE supports an irregular modulation constellation diagram, the base station and the UE may communicate with each other by using the first modulation constellation diagram according to the foregoing method. If the UE does not support an irregular modulation constellation diagram, the base station and the UE communicate with each other by using a conventional regular modulation constellation diagram according to a conventional communication method.

Optionally, in this embodiment of this application, the conventional communication method includes: The base station and the UE communicate with each other based on a regular modulation constellation diagram by using an agreed bit rate. For example, the communication includes transmitting a PBCH, a PDCCH, a PDSCH, a PUCCH, and/or a PUSCH.

Optionally, in this embodiment of this application, the conventional communication method includes: The base station sends scheduling information to the UE, where the scheduling information indicates an order and a bit rate of the regular modulation constellation diagram; and the base station communicates with the UE based on the scheduling information. The scheduling information is information in DCI or information in RRC signaling, for example, is specifically MCS information. For example, the communication includes transmitting a PUCCH and/or a PUSCH.

In a possible implementation C2, the method provided in this embodiment of this application may further include: The base station sends fifth indication information to the UE. When a value of the fifth indication information is in a first state, for example, is 0, the base station and the UE communicate with each other by using a conventional regular modulation constellation diagram. When a value of the fifth indication information is in a second state, for example, is 1, the base station and the UE, such as the first UE or the second UE, communicate with each other by using the first modulation constellation diagram according to the foregoing method.

In a possible implementation C3, the method provided in this embodiment of this application may further include: determining a modulation constellation diagram based on a communication process. For example, for a first communication process, the base station and the UE, such as the first UE or the second UE, communicate with each other by using a conventional regular modulation constellation diagram. For a second communication process, the base station and the UE, such as the first UE or the second UE, communicate with each other by using the first modulation constellation diagram according to the foregoing method. For example, the first communication process includes: a communication process in which the UE is in an RRC non-connected mode (for example, an RRC idle mode and/or an RRC inactive mode), an initial access process, an RRC connection establishment process, and/or an RRC reconfiguration process. For example, the second communication process includes a communication process in which the UE is in an RRC connected mode. For example, the first communication process may include transmitting a system message, a paging message, or an SMS message. For example, the second communication process may be communication that includes transmitting UE-specific data.

In a possible implementation C4, the method provided in this embodiment of this application may further include: determining a modulation constellation diagram based on a control information format and/or a cyclic redundancy check (CRC) scrambling identifier (for example, a radio network temporary identifier (RNTI)) of control information, where the control information may be DCI. For example, for a first control information format, the base station and the UE, such as the first UE or the second UE, communicate with each other by using a conventional regular modulation constellation diagram. That is, control information in the first control information format is transmitted by using the conventional regular modulation constellation diagram. For a second control information format, the base station and the UE, such as the first UE or the second UE, communicate with each other by using the first modulation constellation diagram according to the foregoing method. That is, control information in the second control information format is transmitted by using the first modulation constellation diagram according to the foregoing method. For example, the first control information format may be a rollback format or a default format, for example, a DCI format 0_0 or a DCI format 1_0. For example, the second control information format may be an enhanced format, for example, a DCI format 0_1 or a DCI format 1_1. For example, for a first CRC scrambling identifier, the base station and the UE, such as the first UE or the second UE, communicate with each other by using a conventional regular modulation constellation diagram. That is, control information scrambled according to the first CRC scrambling identifier is transmitted by using the conventional regular modulation constellation diagram. For a second CRC scrambling identifier, the base station and the UE, such as the first UE or the second UE, communicate with each other by using the first modulation constellation diagram according to the foregoing method. That is, control information scrambled according to the second CRC scrambling identifier is transmitted by using the first modulation constellation diagram according to the foregoing method. For example, the first CRC scrambling identifier may be a system information radio network temporary identifier (SI-RNTI), a paging radio network temporary identifier (P-RNTI), or a temporary cell radio network temporary identifier (TC-RNTI). For example, the second CRC scrambling identifier may be a cell radio network temporary identifier (C-RNTI).

The foregoing implementations C1, C2, C3, and C4 may be combined with each other.

For example, implementations C1 and C2 are combined, and the method includes: The UE sends capability information of the UE to the base station, to indicate whether the UE supports an irregular modulation constellation diagram. In addition, the base station sends fifth indication information to the UE, and the fifth indication information indicates a specific communication method. When sending the fifth indication information, the base station may consider a capability of the UE.

For example, implementations C1 and C3 are combined, and the method includes: The UE sends capability information of the UE to the base station, to indicate whether the UE supports an irregular modulation constellation diagram. In addition, for the first communication process, the base station and the UE communicate with each other by using a conventional regular modulation constellation diagram. For the second communication process, when the UE supports an irregular modulation constellation diagram, the base station and the UE communicate with each other by using the first modulation constellation diagram according to the foregoing method; or when the UE does not support an irregular modulation constellation diagram, the base station and the UE communicate with each other by using a conventional regular modulation constellation diagram according to a conventional communication method.

For example, implementations C1 and C4 are combined, and the method includes: The UE sends capability information of the UE to the base station, to indicate whether the UE supports an irregular modulation constellation diagram. In addition, for communication scheduled by using the first control information format, the base station and the UE communicate with each other by using a conventional regular modulation constellation diagram. For communication scheduled by the second control information format, when the UE supports an irregular modulation constellation diagram, the base station and the UE communicate with each other by using the first modulation constellation diagram according to the foregoing method; or when the UE does not support an irregular modulation constellation diagram, the base station and the UE communicate with each other by using a conventional regular modulation constellation diagram according to a conventional communication method.

For example, implementations C2 and C3 may be combined. The method includes: For the first communication process, the base station and the UE communicate with each other by using a conventional regular modulation constellation diagram. For the second communication process, the base station sends fifth indication information to the UE, and the fifth indication information indicates a specific communication method.

For example, implementations C1, C2, and C3 may be combined, and the method includes: For the first communication process, the base station and the UE communicate with each other by using a conventional regular modulation constellation diagram. The UE sends capability information of the UE to the base station, to indicate whether the UE supports an irregular modulation constellation diagram. For the second communication process, the base station sends fifth indication information to the UE, and the fifth indication information indicates a specific communication method. When sending the fifth indication information, the base station may consider a capability of the UE.

For example, implementations C1, C2, and C4 are combined, and the method includes: The UE sends capability information of the UE to the base station, to indicate whether the UE supports an irregular modulation constellation diagram. In addition, for communication scheduled by using the first control information format, the base station and the UE communicate with each other by using a conventional regular modulation constellation diagram. For communication scheduled by using the second control information format, the base station sends fifth indication information to the UE, and the fifth indication information indicates a specific communication method. When sending the fifth indication information, the base station may consider a capability of the UE.

In the foregoing embodiments provided in this application, the method provided in embodiments of this application is described from a perspective of each network element and a perspective of interaction between different network elements. To implement functions in the foregoing method provided in embodiments of this application, each network element may include a hardware structure and/or a software module, and the foregoing functions are implemented in a form of a hardware structure, a software module, or a combination of a hardware structure and a software module. Whether a function in the foregoing functions is performed in a manner of a hardware structure, a software module, or a hardware structure and a software module depends on specific applications and design constraints of the technical solutions.

Figure 11:
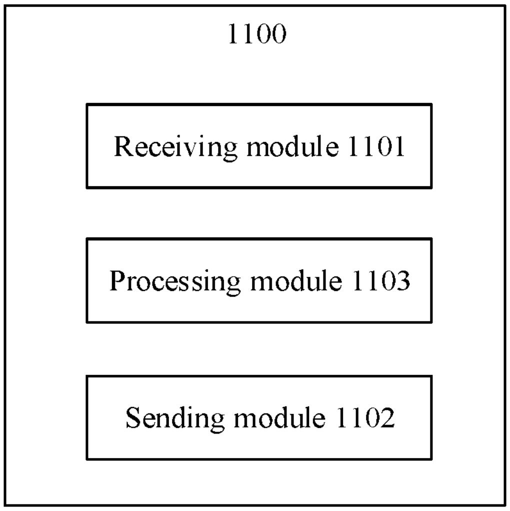
FIG. 11 and FIG. 12 each are a schematic diagram of a structure of an apparatus according to an embodiment of this application.

FIG. 11 is an example diagram of a structure of an apparatus 1100 according to an embodiment of this application.

In a possible implementation, the apparatus 1100 is configured to implement a function of the base station in the foregoing method. The apparatus may be a base station, or may be another apparatus that can implement a function of the base station. The another apparatus can be installed in the base station, or can match the base station for use.

In a possible implementation, the apparatus 1100 is configured to implement a function of the terminal device in the foregoing method. The apparatus may be a terminal device, or may be another apparatus that can implement a function of the terminal device. The another apparatus can be installed in the terminal device, or can match the terminal device for use.

The apparatus 1100 includes a receiving module 1101, configured to receive a signal or information. The apparatus 1100 includes a sending module 1102, configured to send a signal or information. The apparatus 1100 includes a processing module 1103, configured to process the received signal or information, for example, configured to decode the signal or information received by the receiving module 1101. The processing module 1103 may further generate a signal or information to be sent, for example, may be configured to generate a signal or information to be sent by using the sending module 1102.

Division into the modules in embodiments of this application is an example, and is logical function division. In actual implementation, there may be another division manner. For example, the receiving module 1101 and the sending module 1102 may be further integrated into a transceiver module or a communication module. In addition, function modules in embodiments of this application may be integrated into one module, or each module may exist alone physically, or two or more modules may be integrated into one module. The integrated module may be implemented in a form of hardware, or may be implemented in a form of a software function module.

Figure 12:
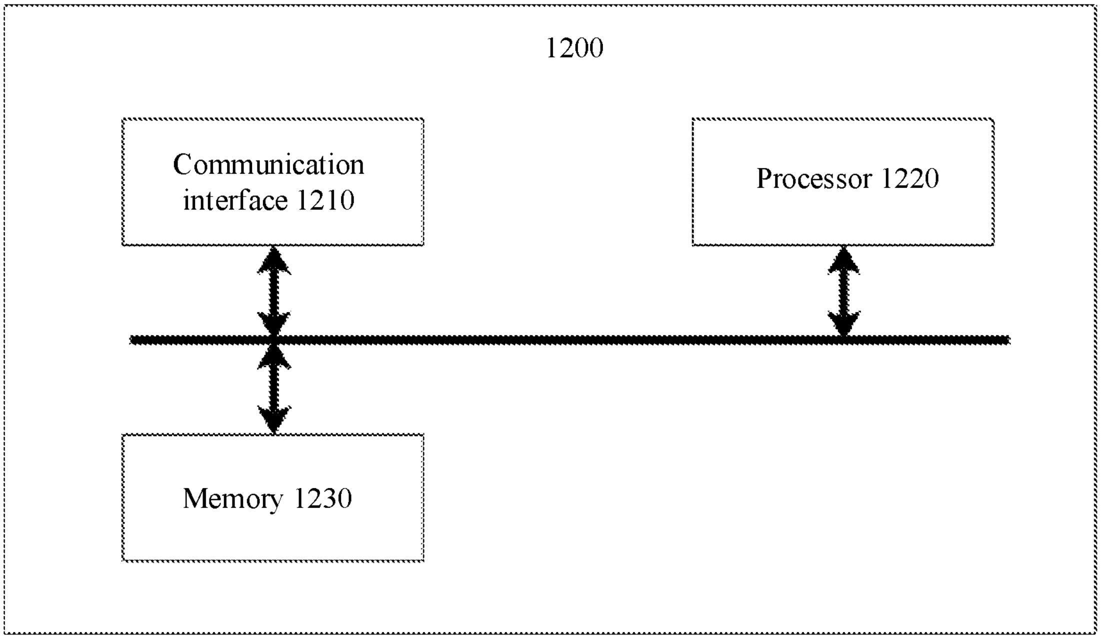

FIG. 12 is an example diagram of a structure of an apparatus 1200 according to an embodiment of this application.

In a possible implementation, the apparatus 1200 is configured to implement a function of the base station in the foregoing method. The apparatus may be a base station, or may be another apparatus that can implement a function of the base station. The another apparatus can be installed in the base station, or can match the base station for use. For example, the apparatus 1200 may be a chip system. For example, the apparatus 1200 includes at least one processor 1220, configured to implement a function of the base station in the method provided in embodiments of this application.

In a possible implementation, the apparatus 1200 is configured to implement a function of the terminal device in the foregoing method. The apparatus may be a terminal device, or may be another apparatus that can implement a function of the terminal device. The another apparatus can be installed in the terminal device, or can match the terminal device for use. For example, the apparatus 1200 may be a chip system. For example, the apparatus 1200 includes at least one processor 1220, configured to implement a function of the terminal device in the method provided in embodiments of this application.

The apparatus 1200 may further include at least one memory 1230, configured to store program instructions and/or data. The memory 1230 is coupled to the processor 1220. The coupling in this embodiment of this application is an indirect coupling or a communication connection between apparatuses, units, or modules, may be in an electrical form, a mechanical form, or another form, and is used for information exchange between the apparatuses, the units, or the modules. The processor 1220 may cooperate with the memory 1230 to implement the functions described in the foregoing method embodiments. The processor 1220 may execute the program instructions stored in the memory 1230. At least one of the at least one memory may be included in the processor 1220.

The apparatus 1200 may further include a communication interface 1210, configured to communicate with another device by using a transmission medium, so that an apparatus in the apparatus 1200 communicates with the another device. The processor 1220 receives and sends signals through the communication interface 1210, to implement the functions described in the foregoing method embodiments. In this embodiment of this application, the communication interface may be a transceiver, a circuit, a bus, a module, a pin, or another type of communication interface.

A specific connection medium between the communication interface 1210, the processor 1220, and the memory 1230 is not limited in this embodiment of this application. In this embodiment of this application, the memory 1230, the processor 1220, and the transceiver 1210 are connected by using a bus 1240 in FIG. 12. The bus is represented by a bold line in FIG. 12. A connection manner between other components is merely an example for description, and constitutes no limitation. The bus may be classified into an address bus, a data bus, a control bus, or the like. For ease of representation, only one bold line is used for representation in FIG. 12, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by a combination of hardware and software modules in the processor.

In embodiments of this application, the memory may be a non-volatile memory, such as a hard disk drive (HDD) or a solid-state drive (SSD), or may be a volatile memory, such as a random access memory (RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store program instructions and/or data.

All or some of the technical solutions provided in embodiments of this application may be implemented by software, hardware, firmware, or any combination thereof. When software is used to implement the technical solutions, all or some of the technical solutions may be implemented in a form of a computer program product. The computer program product includes one or more computer instructions. When the computer program instructions are loaded and executed on a computer, the procedures or functions according to embodiments of the present invention are all or partially generated. The computer may be a general-purpose computer, a dedicated computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium, or the like.

In embodiments of this application, on the premise that there is no logical contradiction, embodiments may be mutually referenced. For example, methods and/or terms in method embodiments may be mutually referenced. For example, functions and/or terms in apparatus embodiments may be mutually referenced. For example, functions and/or terms in an apparatus embodiment and a method embodiment may be mutually referenced.

The foregoing descriptions are merely specific implementations of the present invention. However, the protection scope of the present invention is not limited thereto. Any change or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:

receiving, from a first device, second indication indicating an identifier of a modulation constellation diagram group to which a first modulation constellation diagram belongs and an index of the first modulation constellation diagram in the modulation constellation diagram group;

determining information about the first modulation constellation diagram; and communicating with the first device based on the first modulation constellation diagram, wherein the first modulation constellation diagram comprises M constellation points, M is a positive integer, and wherein the information about the first modulation constellation diagram comprises one of:

a value range of M1 constellation points in the first modulation constellation diagram, wherein M1 is an integer greater than or equal to 1 and less than or equal to M;

offsets of M1 constellation points in the first modulation constellation diagram relative to M1 constellation points in a reference modulation constellation diagram, wherein M1 is an integer greater than or equal to 1 and less than or equal to M; or a rotation phase of the first modulation constellation diagram relative to a reference modulation constellation diagram.

2. The method according to claim 1, wherein the value range of the M1 constellation points in the first modulation constellation diagram comprises at least one of the following:

an amplitude range of the M1 constellation points, and a phase range of the M1 constellation points.

3. The method according to claim 2, wherein the amplitude range of all of the M1 constellation points comprises:

an amplitude extension range of the M1 constellation points relative to the M1 constellation points in the reference modulation constellation diagram.

4. The method according to claim 2, wherein the phase range of the M1 constellation points comprises:

a phase extension range of the M1 constellation points relative to the M1 constellation points in the reference modulation constellation diagram.

5. The method according to claim 1, wherein the first modulation constellation diagram is comprised in N1 modulation constellation diagrams, wherein N1 is an integer greater than or equal to 1, wherein the N1 modulation constellation diagrams are modulation constellation diagrams corresponding to a terminal device of a first type, and wherein communicating with the first device comprises:

transmitting data of a first terminal device with the first device, wherein a type of the first terminal device is the first type.

6. The method according to claim 5, wherein the N1 modulation constellation diagrams and N2 modulation constellation diagrams are comprised in N3 modulation constellation diagrams, N3 is an integer greater than N1 and N2, and N2 is an integer greater than or equal to 1, and wherein the N2 modulation constellation diagrams are modulation constellation diagrams corresponding to a terminal device of a second type.

7. The method according to claim 5, wherein the value range corresponds to the terminal device of the first type.

8. The method according to claim 5, wherein the offset corresponds to the terminal device of the first type.

9. The method according to claim 5, wherein the rotation phase corresponds to the terminal device of the first type.

10. The method according to claim 5, wherein the method further comprises:

sending information about the N1 modulation constellation diagrams to the first device.

11. The method according to claim 5, wherein the method further comprises:

receiving information about the N1 modulation constellation diagrams from the first device.

12. The method according to claim 1, wherein the method further comprises:

sending first indication information to the first device, wherein the first indication information indicates a recommended modulation constellation diagram.

13. The method according to claim 1, wherein modulation constellation diagrams in the modulation constellation diagram group have a same order.

14. The method according to claim 1, wherein the indication information further indicates a bit rate corresponding to the communication.

15. A communication apparatus comprising:

at least one processor and a memory storing programming instructions for execution by the at least one processor to perform operations comprising:

receiving, from a first device, a second indication indicating an identifier of a modulation constellation diagram group to which a first modulation constellation diagram belongs and an index of the first modulation constellation diagram in the modulation constellation diagram group;

determining information about the first modulation constellation diagram; and communicating with the first device based on the first modulation constellation diagram, wherein the first modulation constellation diagram comprises M constellation points, M is a positive integer, and wherein the information about the first modulation constellation diagram comprises one of:

a value range of M1 constellation points in the first modulation constellation diagram, wherein M1 is an integer greater than or equal to 1 and less than or equal to M;

offsets of M1 constellation points in the first modulation constellation diagram relative to M1 constellation points in a reference modulation constellation diagram, wherein M1 is an integer greater than or equal to 1 and less than or equal to M; or a rotation phase of the first modulation constellation diagram relative to a reference modulation constellation diagram.

16. The communication apparatus according to claim 15, wherein the value range of the M1 constellation points in the first modulation constellation diagram comprises at least one of the following:

an amplitude range of the M1 constellation points, and a phase range of the M1 constellation points.

17. The communication apparatus according to claim 16, wherein the amplitude range of all of the M1 constellation points comprises:

an amplitude extension range of the M1 constellation points relative to the M1 constellation points in the reference modulation constellation diagram.

18. The communication apparatus according to claim 16, wherein the phase range of the M1 constellation points comprises:

a phase extension range of the M1 constellation points relative to the M1 constellation points in the reference modulation constellation diagram.

19. The communication apparatus according to claim 15, wherein the first modulation constellation diagram is comprised in N1 modulation constellation diagrams, wherein N1 is an integer greater than or equal to 1, wherein the N1 modulation constellation diagrams are modulation constellation diagrams corresponding to a terminal device of a first type, and wherein communicating with the first device comprises:

transmitting data of a first terminal device with the first device, wherein a type of the first terminal device is the first type.

20. A non-transitory computer-readable storage medium storing one or more programming instructions for execution by at least one processor to perform operations comprising:

receiving, from a first device, a second indication indicating an identifier of a modulation constellation diagram group to which a first modulation constellation diagram belongs and an index of the first modulation constellation diagram in the modulation constellation diagram group;

determining information about the first modulation constellation diagram; and communicating with the first device based on the first modulation constellation diagram, wherein the first modulation constellation diagram comprises M constellation points, M is a positive integer, and wherein the information about the first modulation constellation diagram comprises one of:

a value range of M1 constellation points in the first modulation constellation diagram, wherein M1 is an integer greater than or equal to 1 and less than or equal to M;

offsets of M1 constellation points in the first modulation constellation diagram relative to M1 constellation points in a reference modulation constellation diagram, wherein M1 is an integer greater than or equal to 1 and less than or equal to M; or a rotation phase of the first modulation constellation diagram relative to a reference modulation constellation diagram.

* * * * *